(12) United States Patent
Yahyavi Firouz Abadi et al.

(10) Patent No.: US 11,204,962 B2
(45) Date of Patent: *Dec. 21, 2021

(54) EXPLORABLE VISUAL ANALYTICS SYSTEM HAVING REDUCED LATENCY

(71) Applicant: Palo Alto Networks, Inc., Santa Clara, CA (US)

(72) Inventors: Seyed Amir Yahyavi Firouz Abadi, San Jose, CA (US); Saman Amirpour Amraii, Redlands, CA (US); Laleh Roosta Pour, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/228,195

(22) Filed: Dec. 20, 2018

(65) Prior Publication Data

US 2020/0104306 A1 Apr. 2, 2020

Related U.S. Application Data

(60) Provisional application No. 62/739,788, filed on Oct. 1, 2018.

(51) Int. Cl.
*G06F 16/90* (2019.01)
*G06F 16/901* (2019.01)
(Continued)

(52) U.S. Cl.
CPC .......... *G06F 16/9027* (2019.01); *G06F 7/14* (2013.01); *G06F 16/221* (2019.01);
(Continued)

(58) Field of Classification Search
CPC .............. G06F 16/9027; G06F 16/221; G06F 16/2379; G06F 16/2246; G06F 16/26;
(Continued)

(56) References Cited

U.S. PATENT DOCUMENTS

| | | | |
|---|---|---|---|
| 6,532,017 B1 | 3/2003 | Knittel | |
| 2002/0033837 A1* | 3/2002 | Munro | G06F 16/54 345/654 |

(Continued)

FOREIGN PATENT DOCUMENTS

EP 2477363 7/2012

OTHER PUBLICATIONS

Amraii et al., Explorable Visual Analytics, Knowledge Discovery in Large and High-Dimensional Data, Aug. 24, 2014.
(Continued)

*Primary Examiner* — Hares Jami
(74) *Attorney, Agent, or Firm* — Van Pelt, Yi & James LLP

(57) ABSTRACT

A method and system for processing datasets having a number of data points are described. A portion of the dataset is received and processed in parallel. A view on a display is updated to include a first section of the portion of the dataset after the first section completes processing but before a remainder of the portion of the dataset completes processing. In some aspects, the portion of the dataset can include up to one million or more data points. In some aspects, if a change from the view to a second view is received before processing has completed, an unusable part of the dataset is discarded and/or a reusable part of the dataset that has completed processing is reused for the second view. In some aspects, columns of different dataset may be correlated and/or processed data is provided such that the processed data may be rapidly rendered.

22 Claims, 11 Drawing Sheets

(51) Int. Cl.
*G06F 17/10* (2006.01)
*G06F 16/904* (2019.01)
*G06F 16/22* (2019.01)
*G06F 16/23* (2019.01)
*G06F 16/26* (2019.01)
*G06F 7/14* (2006.01)

(52) U.S. Cl.
CPC ...... *G06F 16/2246* (2019.01); *G06F 16/2379* (2019.01); *G06F 16/26* (2019.01); *G06F 16/904* (2019.01); *G06F 17/10* (2013.01)

(58) Field of Classification Search
CPC .......... G06F 16/904; G06F 16/29; G06F 7/14; G06F 17/10
USPC .......................................... 707/736, 737, 741
See application file for complete search history.

(56) References Cited

U.S. PATENT DOCUMENTS

| | | | |
|---|---|---|---|
| 2005/0273573 A1* | 12/2005 | Liu | G06F 16/86 711/206 |
| 2011/0261049 A1 | 10/2011 | Cardno | |
| 2012/0020537 A1* | 1/2012 | Garcia | G06T 7/246 382/129 |
| 2013/0117322 A1* | 5/2013 | Fischer | G01C 21/32 707/792 |
| 2013/0145473 A1* | 6/2013 | Cormode | G11B 20/00086 726/26 |
| 2015/0109338 A1 | 4/2015 | McKinnon | |
| 2015/0128150 A1* | 5/2015 | Ueda | G06F 9/4881 718/105 |
| 2016/0124992 A1* | 5/2016 | Alesiani | G06F 9/5033 707/737 |
| 2017/0141790 A1 | 5/2017 | Gopal | |
| 2017/0323028 A1 | 11/2017 | Jonker | |
| 2018/0348961 A1* | 12/2018 | Wilczynski | G06F 16/29 |
| 2019/0065563 A1* | 2/2019 | Petculescu | G06T 11/206 |
| 2019/0236403 A1 | 8/2019 | Lilley | |

OTHER PUBLICATIONS

Amraii et al., Exporable Visual Analytics (EVA) Interactive Exploration of LEHD, Cargegie Mellon University, Jun. 2015.
Amraii et al., Interactive Exploration of LEHD, A Case Study in Knowledge Discovery, Sep. 24, 2014.
Amraii et al., Knowledge Discovery in Large and High-Dimensional Space, Apr. 5, 2014.
Huguenin et al., Cheat Detection and Prevention in P2P MOGs, IEEE, 2011.
Pour et al., Algebraic Reasoning for SHIQ, Concordia University, Jun. 7, 2012.
Saman Amirpour Amraii, Human-Data Interaction in Large and High-Dimensional Data, University of Pittsburgh, Nov. 27, 2017.
Seyed Amir Yahyavi Firouz Abadi, On the Scalability and Security of Distributed Multiplayer Online Games, School of Computer Science, McGill University, Apr. 2014.
Wang et al., I Know What you Did on Your Smartphone: Inferring APP Usage over Encrypted Data Traffic, 2015 IEEE Conference on Communications and Network Security (CNS), pp. 433-441, 2015.
Yahyavi et al., AntReckoning: Dead Reckoning Using Interest Modeling by Pheromones, IEEE, 2011.
Yahyavi et al., Interest Modeling in Games: The Case of Dead Reckoning, Multimedia Systems, (2013, 19:255-270, Jul. 7, 2012.
Yahyavi et al., Peer-to-Peer Architectures for Massively Multiplayer Online Games: A Survey, ACM Computing Surveys, vol. 46, No. 1, Article 9, Oct. 2013.
Yahyavi et al., Towards Providing Security for Mobile Games, MobiArch'13, pp. 47-52, Oct. 4, 2013.
Yahyavi et al., Towards the Design of a Human-Like FPS NPC using Pheromone Maps, 2013 IEEE International Games Innovation Conference (IGIC), pp. 275-282, 2013.
Yahyavi et al., Watchmen: Scalable Cheat-Resistant Support for Distributed Multi-Player Online Games, 2013 IEEE 33rd International Conference on Distributed Computing Systems, pp. 134-144, 2013.

* cited by examiner

EXPLORABLE VISUAL ANALYTICS SYSTEM HAVING REDUCED LATENCY

CROSS REFERENCE TO OTHER APPLICATIONS

This application claims priority to U.S. Provisional Patent Application No. 62/739,788 entitled SYSTEM AND METHOD FOR PERFORMING EXPLORABLE VISUAL ANALYTICS filed Oct. 1, 2018 which is incorporated herein by reference for all purposes.

BACKGROUND OF THE INVENTION

Big data involves datasets that may not be stored in the memory of a single computing unit, which makes working with big data challenging. From the standpoint of a browser, or client, the datasets may include millions or billions of data points. Consequently, all of the data points in the dataset cannot be loaded onto a client. Increasingly, big data is desired to be used to understand and predict trends in a variety of fields. In order to utilize big data, tools that allow users to explore, intuitively understand and draw conclusions from the data are desired. However, because of the size of the datasets, loading the requisite number of data points, performing analytics, rendering charts and other activities typically involve large latencies. Such latencies adversely affect the ability of tools to provide sufficient interactivity with the data. Accordingly, what is desired is an improved mechanism for utilizing large datasets.

BRIEF DESCRIPTION OF THE DRAWINGS

Various embodiments of the invention are disclosed in the following detailed description and the accompanying drawings.

DETAILED DESCRIPTION

Figure 1A:
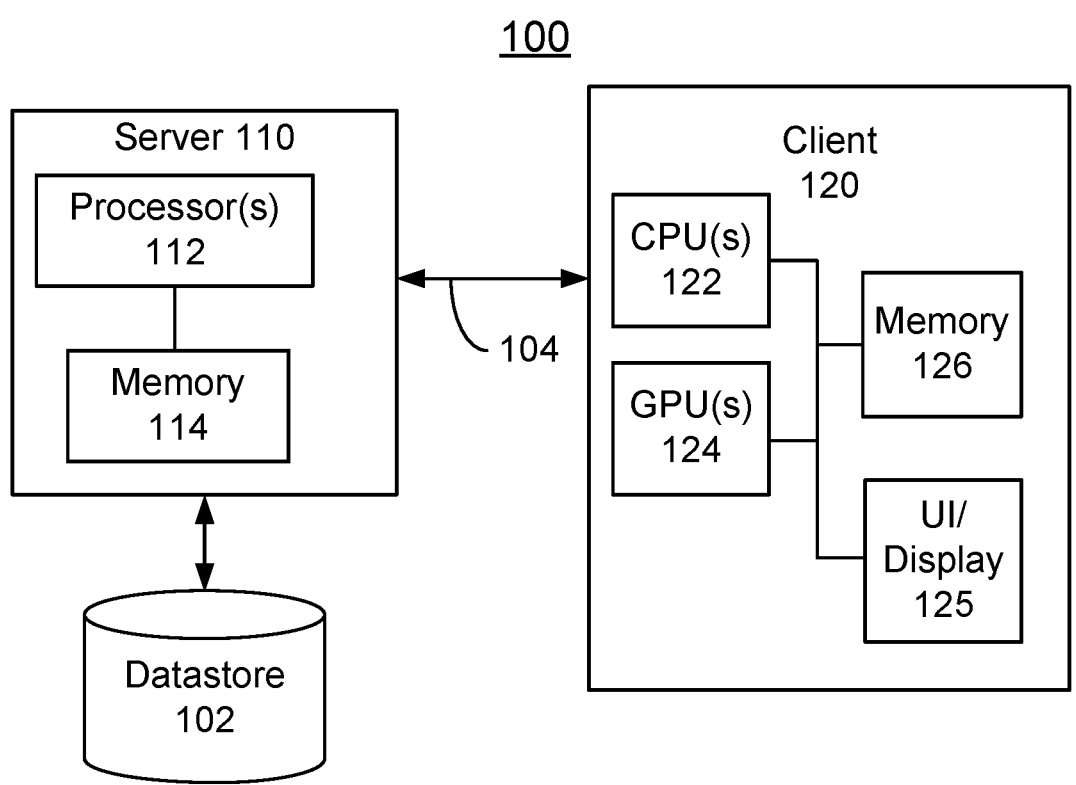
FIGS. 1A-1B are views illustrating an exemplary embodiment of a system for providing explorable visual analytics having reduced processing latency for very large datasets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for processing datasets having a number of data points are described. A portion of the dataset is received ("received data"). In some aspects, the received data includes a largest number of points available not exceeding a maximum number of data points. The received data is processed in parallel. A view on a display is updated to include a first section of the received data after the first section completes processing but before a remainder of the received data completes processing. In some cases, a bottleneck may occur at visualization or some other portion of data processing. In such cases, the visualization of the first section of the data may take some time due to the bottleneck. During that time, parallel processing is continued. Some or all of the subsequent sections may have finished processing before the first section received. In such a case, the results of subsequent sections are queued for visualization. During normal operation, however, at least one section of data may be used to update the display before at least one other section of data has completed processing. In some aspects, if a change to a second view is received before processing has completed, part of the received data is discarded and/or part of the received data is reused for the second view if possible. In some cases, the dataset may include multiple intervals. In such embodiments, binary memories corresponding to the multiple intervals are provided to graphics processor memory. In such a case, the graphics processor shows a view for the selected interval and hides the view(s) for unselected intervals. In some aspects, columns of different dataset may be correlated, and/or processed data is provided such that the processed data may be rapidly rendered.

Figure 1B:
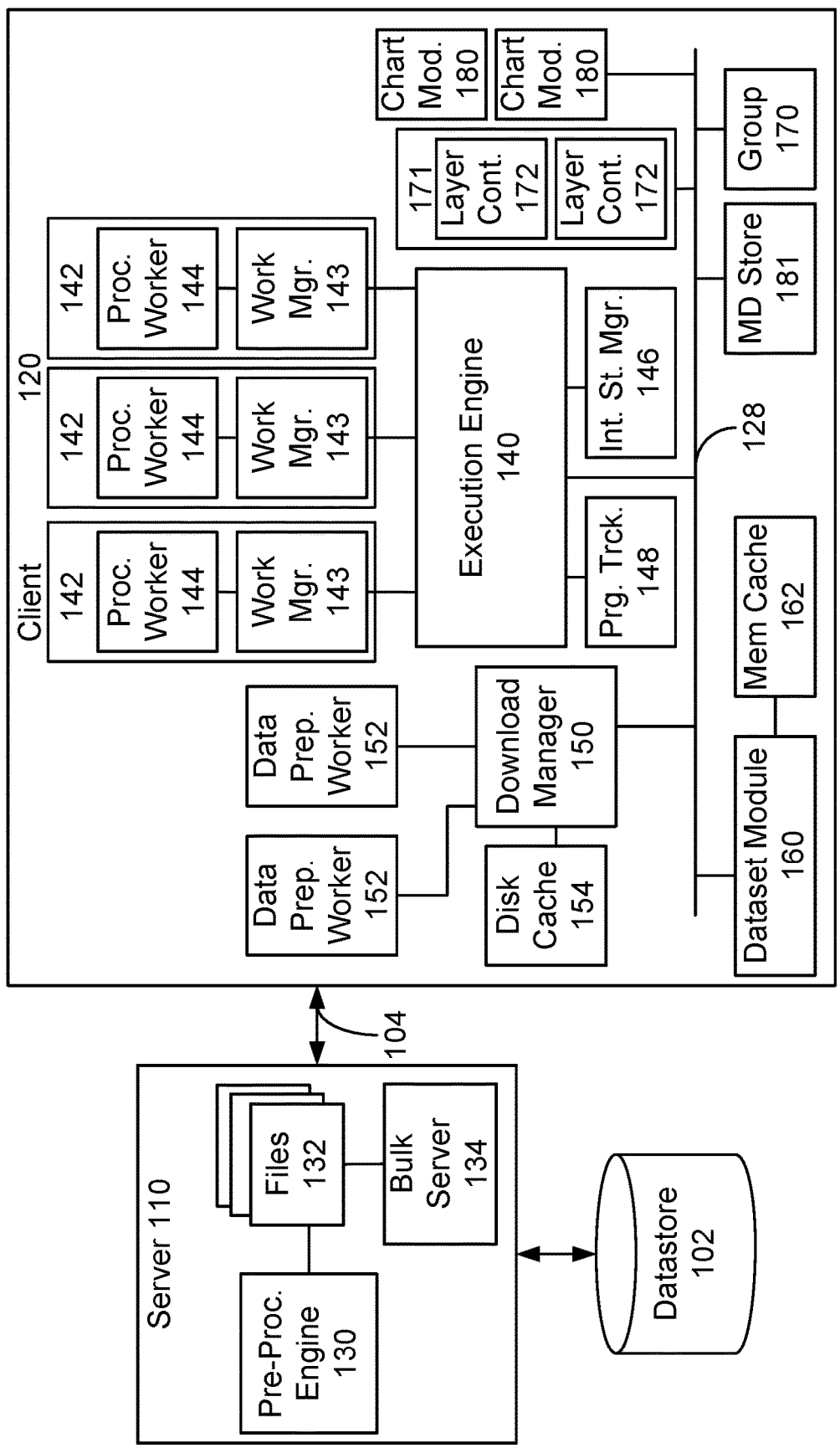

FIGS. 1A-1B are block diagrams of an embodiment of system 100 used for analyzing, manipulating and visualizing large datasets. As used herein, explorable visual analytics includes analyzing, manipulating and visualizing data from large datasets. A large dataset is one which includes one hundred thousand or more data points. In some cases, the dataset may include a million data points, tens of millions of data points, billions of data points or more. In particular, FIG. 1A illustrates one view of an embodiment of a server 110 and client 120 coupled via a network 104. For simplicity, only certain portions of server 110 and client 120 are shown in FIG. 1A. Although only one client 120 is shown as coupled to server 110, multiple clients typically utilize server 110. Server 110 includes at least one processor 112 and memory 114. Processor(s) 112 may include multiple cores. Processor(s) 112 may include one or more central processing units (CPUs) and/or one or more graphical processing units (GPUs). Memory 114 can include a first primary storage, typically a random access memory (RAM) and a second primary storage area, typically a non-volatile storage such as solid state drive (SSD) or hard disk drive (HDD). Memory 114 stores programming instructions and data, in the form of data objects and text objects, in addition to other data and instructions for processes operating on processor(s) 112. Primary storage typically includes basic operating instructions, program code, data and objects used by processor(s) to perform its functions. Primary storage devices (e.g., memory 112) may include any suitable computer-readable storage media, described below, depending on whether, for example, data access needs to be bi-directional or uni-directional. Server 110 generally includes other components that are not shown for simplicity.

Similarly, client 120 includes CPU(s) 122, GPU(s) 124, display/user interface (UI) 125 and memory 126. Client 120 generally includes other components that are not shown for simplicity. CPU(s) 122 and GPU(s) 124, each of which generally includes multiple cores. Memory 126 is analogous to memory 112 in that memory 126 may function as primary storage including basic operating instructions, program code, data and objects used by CPU(s) 122 and GPU(s) 124 to perform their functions.

Server 110 is coupled with datastore 102. Datastore 102 archives one or more very large datasets. For example, as mentioned above, such a dataset may include tens of millions or billions of data points. Although only a single datastore 102 is shown, server 110 may be coupled with multiple datastores in some embodiments. Using instructions retrieved from memory 110, processor(s) 112 control the pre-processing and delivery of data in datastore 102.

FIG. 1B illustrates another view of an embodiment of system 100 including server 110, client 120, datastore 102 and network connection 104. Only some components of server 110 and client 120 are shown for clarity. Although described in the system 100, other computer architectures having different configurations of subsystems may also be utilized and such systems may be used to perform the methods as described herein. For example, in other embodiments, functions carried out by various components described herein may be combined in other manners into other, different, fewer and/or more components.

Server 110 includes pre-processing engine 130, files 132 and bulk server 134. Server 110 is platform agnostic and may utilize Scala, Java, Spark and/or analogous technologies for preprocessing engine 130 and/or bulk server 132. Pre-processing engine 130 prepares the dataset stored in datastore 102 for use by client 120. Pre-processing engine 130 may place the dataset in fully columnar format, index the dataset, build trees as discussed below, compress data, perform aggregation or sampling of data and perform other analogous functions. In general, during the indexing process, the data is stored in tiles with a specific naming and folder hierarchy. For example, for a dataset including census data, pre-processing engine 130 may index the population data by latitude and longitude (i.e. geographically) to prepare the data for visualization on a map. In its simplest form, if indexing the data for latitude and longitude, pre-processing engine 130 may generate four tiles: tile_-180_0_0_-90_0, tile_-18_0_0_90, tile_0_180_-90_0, tile_0_180_0_90. These four tiles each correspond to a range of latitude and longitudes (e.g., from −180 to 0 and from −90 to 0, etc.). When a user requires a portion of the data, say 10-20 of longitude and 20-30 of latitude, server 110 can quickly find the file(s)/tile(s) that encompasses that portion of the data and send that over to client 120. In general, the process of building a tree is to create a series of indexes on top of the data (each level of the tree corresponds to one set of indexing). However, larger ranges (i.e., higher levels of the tree close to root) include many data points, often more than what client 120 can load (e.g. more than the maximum number of data points). Consequently, storing such tiles brings no added value. Instead, tiles on the higher levels (i.e., closer to the root) can be sampled versions of all the data points in that range, so that their size remains in a manageable range. In addition, server 110 generally splits tiles into one or more parts for processing on client 120, as discussed below with respect to FIG. 4.

Files 132 are provided by pre-processing engine 130 and may include online analytical processing (OLAP) cubes indexed to the desired columns of data. Bulk server 134 receives requests from client 120 and provides subsets of files 132 to client 120 in response to requests. Bulk server 134 may also serialize the data being provided to allow for more efficient delivery to client 120. Thus, bulk server 134 may function as a file server. In some embodiments, bulk server 134 may include a pass-through mode in which bulk server 134 directly queries datastore 102, compresses data to binary memories and sends the compressed binary memories to the client 120. In such embodiments, random sampling may be achieved using support provided by datastore 102, if any, or by server 110 sampling data in datastore 102.

Client 120 provides explorable visual analytics that allow a user to perform analytics on, visualize and otherwise interact with data provided by server 110. Thus, client 120 provides views of data to a user. As used herein, a view includes a visual representation of the data. For example, a view includes but is not limited to tables, graphs, maps having data represented based on geography, multi-dimensional views representing various features and/or other charts. Additional representations, such as sound, may accompany the visual representation and thus may supplement the view. Further, in some embodiments, a view can include consumption of the data in another manner. For example, providing a view could include outputting the processed data to not only charts, but also files or other applications.

Client 120 includes execution engine 140, download manager 150, dataset module 160, group module 170, layer container module 171, layer containers 172, chart modules 180 and metadata store 181. Chart module 180 is responsible for visualizing the data and generally includes one or more layers. In some embodiments, chart module 180 is specifically configured for use with components 140, 150, 160, 170, 171 and 181. In other embodiments, conventional chart modules, such as an off-the-shelf charting library, might be used. This is possible because layer containers 172 handle logic and data for the corresponding chart module 180. Stated differently, the data that should be loaded, replaced, or otherwise modified for a chart is abstracted in layer containers 172. Consequently, chart module 180 can simply receive the data and display it. As a result, chart module 180 can use specialized libraries configured specifically for system 100 (e.g. chart module 180 can be configured specifically for system 100) or can utilize off-the-shelf libraries (e.g. chart module can be a conventional chart module). In some embodiments, there are two types of chart modules: single-part and multi-part. Single-part chart modules receive data in one batch, erase the old visualization being shown, and completely replace data for the old visualization with the new data. For example, a typical line chart module erases the last line chart and shows a completely new one based on the new data. Multi-part chart modules are more complex. These chart modules can accumulate the results and gradually add them to the visualization. For example, a map chart module can receive the answers for a portion of the map and add the answers to the screen without erasing the other parts already added there. These progressive chart modules may use more knowledge of the complexities of system 100. Thus, such a chart module may be configured for use with system 100.

Layer containers 172 contain the layers for a particular chart. Thus, there is generally a one-to-one relationship between layer containers 172 and chart modules 180. Layers are an atomic structure for bundling the answers generated by system 100. For example, suppose the user wants to create a chart that shows sum(income) over time. Here, two arrays are to be generated: an array that has all the timestamps (e.g., [2000, 2001, 2002]), and another array that has the sum of income at each year (e.g., [1000, 1500, 900]). Because data is divided into multiple parts and because of the complex nature of many analytical functions, the order of rows in the output can be different than that in the input. Consequently, when the two arrays mentioned above are received, it may be difficult to determine whether the income of 1000 belongs to year 2000, 2001, or 2002. In order to avoid such problems, multiple dimensions to multiple axes of a class called "layer" are assigned. A layer essentially informs system 100 that all the answers required for each axis must be prepared together and that their rows should match each other. In the example above, one layer can be created with two axes x and y, time assigned to x, sum (income) to y, and then get the results as one bundled package in the corresponding layer container 172. Layers have also a conceptual correspondence to the visual layers in the corresponding charts. For example, in a line chart with multiple lines overlaid, each line can belong to one layer. Or, in a map view showing sales and demographics data, each data point can be represented by one layer. In general, a chart can includes one or more layers.

In some embodiments, layer containers 172 also receive the partial results from execution engine 140, discard stale results, for example a partial result that comes from a processing module 142 (described below) that belongs to an old recipe (described below). This situation occurs when the user changes a parameter and demands a new updated calculation while the system was still busy calculating the results of the previous recipe. In such embodiments, layer containers 172 can also combine partial results if necessary, update the progress of the total combined result according to the partial progress of each individual part of the answer, and send the combined result accompanied by some metadata to the chart 180 or other output. For example, layer containers 172 can provide output not only to charts 180 but also to the console, another file or another library/application (not shown) on client 120. Thus, the user can utilize the result of a layer container 172 in a different application.

Layer containers 172 may also facilitate map views, particularly if a user zooms in or out. Suppose a user is looking at a map view and then zooms in. The old portion being viewed is replaced with four new portions from the next level of the corresponding tree (described below). However, these parts are processed in separate workers and are can be received at different times. If chart module 180 attempts to display each new part as soon as it is received, the old bigger part would be replaced as soon one of the four new smaller parts is received. However, chart module 180 would then have to wait for the other three smaller parts to be able to draw all four parts. The visual effect of that is that map views could exhibit a significant amount of flicker. As the user zooms in or out, suddenly a large portion of the view becomes empty and then it gradually fills back up. To address this issue, layer containers 172 consider the tree hierarchy (described below). When replacing a part with its children/parents, layer containers 172 ensure that the relevant parts have been received before the results are sent to chart module 180 for visualization. This technique can resolve the flickering issue.

In the embodiment shown, metadata store (MDS) module 181 stores all the dimensions, filters, their relationships, and arguments. MDS module 181 is used to allow the user to define their desired analytics. A dimension is a function performed on a row of data (defined as a set of dependencies of the dimension) and based upon a set of input arguments. Dependencies of a dimension can be columns of a dataset or other dimensions. In some embodiments, a dimension is the smallest unit of computation in client 120. A recipe is a set of dimensions, filter, and possibly data that are sent to the parallel processing module 142 for execution. For example, a user-defined transaction may be:

row1=mds.addRowDimension(col_income, func_multiply, 2);

row2=mds.addRowDimension(row1, func_divide, 10);

These instructions tell MDS module 181 that the user wants to get the income column from the data, and multiply it by 2. The user wants to take the result of that calculation, and divide it by 10. Through a set of instructions such as this, the user can define a complex tree of analytics commands. The input of one command can depend on the output of one or more previous commands/dimensions. One of the main responsibilities of MDS 181 is to check for the correctness of these dependencies. For example, one cannot multiply income_column from census data by sales_column from sales data, because these columns belong to different datasets. Consequently, the columns should be first joined before they can be multiplied. In addition to dimensions, a user can also define a filter utilizing MDS 181. A filter is similar to a dimension in some embodiments. A filter depends on other dimensions for input(s), has a filter function, and some arguments. However, dimensions do not depend on filters. After the user defines the dimensions, the user can assign the dimensions to layers. The user can also assign filters to layers or a group of layers. An example of a filter assigned to a group of layers is a brush filter that affects multiple charts at once. The act of assignment is the command that tells system 100 the user is ready and wants to calculate the analytics that have been defined through dimensions/filters.

Using MDS 181, a user can assign dimensions and client 120 can move forward with processing until the result is depicted on display 125. In some embodiments, a backward path is also provided in client 120. Such a backward path starts from user interactions with the chart, and goes back to an updated execution pipeline. This is accomplished using chart module 180 and layer containers 172. Some chart modules 180 can call back layer container 172. These chart modules 180 routinely check some of their parameters (e.g., what area the user is viewing), and send those parameters back to their corresponding layer container 172. For example, chart module 180 can inform corresponding layer container 172 that the user is looking at coordinates [a,b] on the x axis and [c,d] on the y axis. Layer container 172 then translates these numbers back from the GPU coordinate system to the data coordinate system. In the example above in which the user is looking at coordinates [a,b] and [c,d], layer container 172 translates these to [m,n] in latitude and [p,q] in longitude. Layer container 172 adds these values as filters to the corresponding layer(s). This act of adding filters to the layer or updating the filters of that layer generates another execution pipeline because group module 170 (described below) is monitoring those filters/layers and detects something has changed. Group module 181 generates new recipes, as described below, which eventually generates new results that are then visualized on display 125. These initial simple recipes can be merged into more complex recipes based on their characteristics (such as time of the start of the executions, the dataset they belong to, the dimensions, the set of filters acting on the data, etc.) for processing by execution engine 140. These more complex recipes are then sent to one or more processing workers 144 for execution in separate threads.

Group module 170 is connected to the message bus 128 in the embodiment shown. When the user creates some charts, the user also assigns/allocates the charts to a group. A group is similar to a dashboard: a set of charts that are related to each other, often because they have some common filters. Each group module 170 observes a subset of the charts/layers in the system. When the user assigns one of the axes of one of the layers to a dimension (through a command sent to MDS module 181 as described above), the corresponding group 170 is notified. Group module 170 starts building a recipe. As mentioned above recipe is a set of data structures that defines what dimensions should be calculated, what datasets the dimensions depend on, and what filters should be applied on the output result. Thus, a recipe may be a list of all the analytics that are required to create the final result for a chart. For example, the recipe may include: get the income column, multiply it by 2 and then divide the result by the total number of jobs column, then assign everything to axis X in chart 1. In some embodiments, group module 170 is responsible for creating this recipe from the dimensions the user generates. When one of these dimensions is changed (e.g., multiply by two in the example above is changed to multiply by three), group module 170 is notified and creates a new recipe.

In addition to creating recipes, group module 170 generates a message for dataset module 160. This message informs dataset module 160 of what real datasets are needed. As used herein, a real dataset is an original datasets stored on server 110. Synthetic datasets are temporary, created on client 120 as the result of processing the data and applying the filters. For example, when the user is looking at a map view, the boundary of the map is defined as a set of filters. The boundaries may be as described in the census/latitude-longitude example above. Group module 170 collects these filters and notifies dataset module 160 that columns latitude, longitude, and income should be downloaded from server 110, but that the latitude and longitude should be in ranges [a, b], and [c, d]. Dataset module 160 combines all the messages received from all the group modules 170, and determines all the filter ranges applied to the columns. Using the manifest, described below, dataset module 160 finds which tiles of which trees should be downloaded.

Each group module 170 also monitors the dimensions/filters allocated to its charts and layers. If one of these dimensions changes, e.g. a change in the filter argument, group module 170 restarts the recipe creation process and sends a new message including the new recipe to execution engine 140 and another new message to the dataset module 160 (indicating the columns needed and their filters). Thus, client 120 may start an analytics process if assignment/unassignment of a dimension/filter to a layer has been completed and the parameters of one of the assigned (whether directly or indirectly) dimensions/filters changes. This change can happen through an application program interface (API) or through user interaction with chart modules 180 (discussed below).

In operation, therefore, group module 170, layer container 172 and chart module 180 are used to provide visualizations of data provided by server 110. Chart module 180 detects the viewable area in the GPU coordinate system. The coordinates of this area are then sent to the corresponding layer container 172, which translates this coordinate system to the coordinate system of the original (real) dataset. Layer container 172 then creates a filter and assigns the filter to the layer of the corresponding chart(s). Group 170 module is notified of the changes (e.g. of the new filter added). Group module 170 creates a new recipe for execution engine 140. The creation of a new recipe in turn results in download of new data (if necessary) and processing that data in workers, described below, and eventually sending the final combined results to layer containers 172 and through them to charts 180.

Download manager 150 and dataset module 160 are coupled with caches 154 and 162, respectively. Download manager 150 can also use one or more instances of data preparation workers 152. Download manager 150 controls external requests for data from server 110, downloading of data from server 110 as well as unpacking/uncompression of data, shape processing and any other pre-processing performed by data preparation workers 152 to prepare the downloaded data for consumption by client 120. As is indicated by the data preparation workers 152, pre-processing of the received data is performed in parallel. Download manager 150 thus controls the parallel pre-processing and queueing of jobs for the data preparation workers 152. Download manager 150 may also perform on-disk caching at cache 154 and garbage collection to free up memory when necessary.

Dataset module 160 determines the data to be downloaded based on information provided by server 110 and group module 170. Although a single instance of dataset module 160 is shown, multiple instances of dataset module 160 can be created. In some embodiments, dataset module 160 determines the level and tile(s) of the data tree(s) to be downloaded from server 110. Dataset module 160 does so using a manifest (described below). The tile(s) identified by dataset module 160 include in total not more than a maximum amount of data that may be determined based on client resource(s). In some embodiments, the maximum amount of data is one million data points. In other embodiments, the maximum number of data points is two million. Other numbers of data points are possible. In some embodiments, the dataset module 160 selects the tile(s) and level such that the requested number of data points is as large as possible for the tree without exceeding the maximum number of data points. In addition, dataset module 160 caches data in memory cache 162, sends data to the execution engine 140 for processing and may garbage collect the unnecessary data when necessary. For example, if the garbage level exceeds a certain threshold, which can be based on different caching policies as such least recently used (LRU), least-frequently used (LFU), and the like, dataset module 160 can perform garbage collection. In some embodiments, download manager 150 can perform garbage collection in a similar fashion.

In pass-through mode, dataset module 160 and download manager 150 may perform additional functions. In pass-through mode, server 110 primarily connects to datastore 102, reads a file, ands generate the necessary metadata for that dataset. For example, the type of columns and the statistics for those columns may be part of the metadata generated. Client 120 performs live queries directly on server 110. Server 110 typically converts the resulting data to efficient binary format, compressed columnar format and then streams the converted data to client 120. Dataset manager 160 and download manager 150 perform queries in a smart fashion so that small changes do not translate to a new query, which could result in an additional latency. Dataset manager 160 and download manager 150 also partition the data in such embodiments so that long wait times due to receiving all of the data in one batch are not introduced. Instead, receipt of the data is broken down and done in separate queries to provide parallelization.

Execution engine 140 receives data to be processed from dataset module 160, splits the data to be processed into multiple threads, controls parallel processing of data in processing modules 142, collects the results of the parallel processing and provides the results for output. To parallel process the data, execution engine 140 uses one or more instances of processing modules 142, intermediate state manager module 146 and progress tracker module 148. Each processing module 142 may include a processing worker manager 143 and a processing worker 144. Processing worker 144 performs the calculation(s) for the processing module 142. For example, processing worker 144 may include computations such as multiply, sum, average, topK (select top k values); operations such as group by, reduce, flatten and join; and/or other functions. Processing workers 144 also merges results. Processing worker manager 143 sends the functions to be performed to the processing workers 144, receives results from the processing worker(s) 144 and merges results as needed.

In some embodiments, client 120 is used to perform two types of calculations: (1) calculations that keep the order of rows in the output; and (2) calculations that do not maintain the order of rows in the output. For example, if each row of column income is multiplied by one thousand, the output data still has the same rows as the input data. Even a filter is added, the output still has a meaningful one-to-one relationship with the input. However, if the calculation determines the average of all income, the final output is one number and does not correspond row to row to the original input data. A type (1) calculation generates a new dataset that is similar to the input data (i.e. the real dataset). A type (2) calculation generates a new data that does not correspond row-to-row to the input ("synthetic dataset"). In some embodiments, merging of partial results for synthetic datasets occurs in processing workers 144 while merging of results for real datasets occurs in layer containers 172 and chart modules 180. In some embodiments, for synthetic datasets, when worker manager 143 creates a new processing worker 144, the new part of the data and the results from older processed parts are sent to the new processing worker 144, where the data are then merged. Eventually, the last processing worker 144 that operates on the results of a recipe creates the final fully merged result. This fully merged result is sent to layer container 172 and eventually to chart module 180. In such embodiments, each part is processed separately and there is no need to merge the parts for real datasets. For example, each part can correspond to points on a map showing the location of a person. In such cases, different rows of the data do not interfere with each other. Consequently, the partial results for each part of the map can be sent directly to chart module 180. Chart module 180 then updates the corresponding part of the map as new processed parts are received.

Intermediate state manager module 146 tracks the intermediate results from processing modules 142 when multiple processing modules 142 are used for a thread. Data are split into multiple parts, generally by server 110, and separately processed in threads. Intermediate state manager 146 keeps the result of each part. When the next processing worker 142 starts, intermediate state manager module 146 provides the intermediate state for merging the results. For example, suppose two processing workers 142 are used and data are split into three parts: part1, part2 and part3. The calculations performed are a simple sum function. Processing worker one calculates sum for part1 as 51; processing worker two calculates sum for part2 as 52. Intermediate state manager module 146 has both sums. Now that processing worker one is finished, processing worker one starts working on part3. Processing worker one receives both 51 and 52 as sums calculated up to this point. So processing worker one starts with merging these states, obtains the sum=103 and then adds the part3 numbers. A "signature" is provided for each buffer computed that tracks that this buffer was calculated based on the results of these parts and with these parameters. As discussed below, progress tracker module 148 also tracks which parts have been processed and which ones are still waiting to be processed.

Progress tracker module 148 tracks the progress of the processing modules 142 and assists in optimizing execution by ensuring that further execution is performed only if a certain amount of progress has been met. Progress tracker module 148 and intermediate state manager module 146 also assist in ensuring processes that started at different times are executed separately and correctly.

Parallel processing is controlled by execution engine 140 such that after a first section of the received data completes processing but before a remaining section of the received data completes processing the first section is provided to layer container 172 and such that layer container 172 updates the view after the first section completes processing but before the remaining section completes processing. Stated differently, parallel processing is controlled by execution engine 140 such that the view provided to display 125 is progressively updated during processing of the data. In some embodiments, execution engine 140 also controls processing of the data such that in response to receiving a request to change from the view to a second view before the data has completed processing, unprocessed data can be discarded and/or reused. In some embodiments, execution engine 140 determines whether a part of the data that is at least partially processed is reusable for the second view, discards a part of the data before processing is completed if the part of the data is not reusable and reuses the part of the portion of the dataset for the second view if the part is reusable. Execution engine 140, download manager 150, dataset module 160, group module 170, layer containers 172, chart modules 180 and MDS module 181 communicate via message bus 128.

Figure 2:
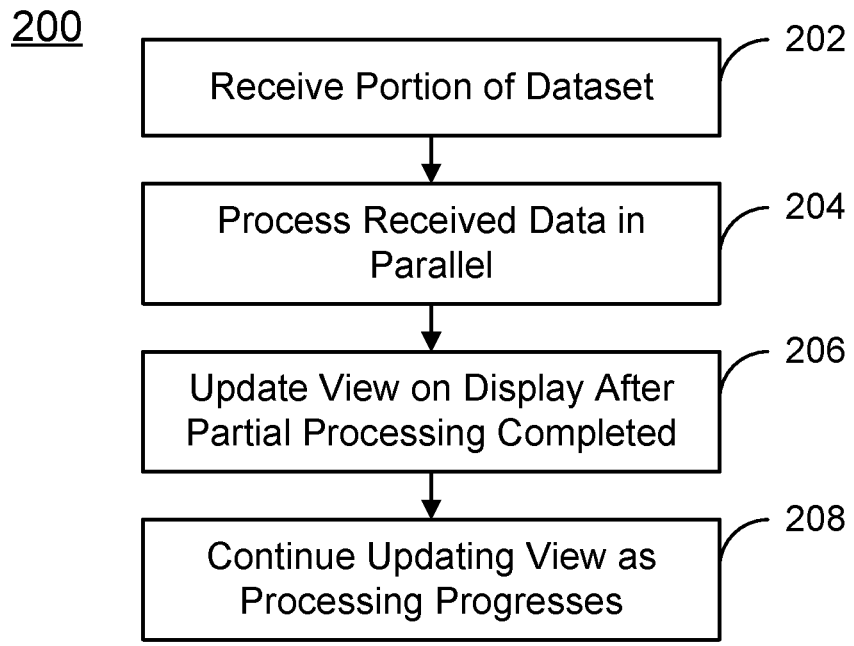
FIG. 2 is a flow chart depicting an embodiment of a method for providing explorable visual analytics having reduced processing latency for very large datasets.

FIG. 2 is a flow chart depicting an embodiment of method 200 for processing data having with reduced processing latency for very large datasets. For example, such a large dataset may have one million data points or more, ten million data points or more, or at least one billion data points. For simplicity, method 200 is described in the context of system 100. However, method 200 may be used in conjunction with other architectures. Method 200 is explained in the context of a single dataset. However, method 200 may be extended to multiple datasets which might be joined. For example, demographics data for one dataset may be joined with sales data from another data set for analysis and visualization.

A portion of the dataset ("received data") is received by client 120, at 202. The received data may be obtained in response to a request for data made from client 120 to server 110. The received data includes a requested number of data points that does not exceed a maximum number of data points. This maximum number of data points may be set by default, selected by a user of client 120, or based on a query of client resources. As discussed above, the maximum number of data points may be a million data points or more. In some embodiments, the requested number of data points is as large as possible for the data structure in server 110 without exceeding the maximum number of data points. For example, the received data may include at least 500,000 data points or more. The received data is generally compressed, for example in binary format, and is typically in columnar format. Data are received by download manager 150 and may be cached at disk cache 154.

The received data are processing in parallel, at 204. Processing includes pre-processing by download manager 150 and processing by execution engine 140. Pre-processing at 204 includes performing uncompression if the received data is compressed and other processing for preparation for display and/or analytics. For example, shape processing may be performed at 204. Pre-processing can be parallelized using data preparation workers 152. Although two data preparation workers 152 are shown, another number may be used by download manager 150. The pre-processed data may be provided to dataset module 160, which may cache the data in memory cache 162.

Also at 204, execution engine 140 performs additional processing in parallel. In some embodiments, the data in each tile may be split into parts by server 110. Thus, a tile may include one or more parts for parallel processing. In some embodiments, dataset module 160 may also split the data into parts. Alternatively, for example in pass-through mode, dataset module 160 can do queries that are split into parts. Execution engine 140 can also split the data into parts in some embodiments. To perform parallel processing, execution engine 140 provides the parts of the received data to multiple threads, processes the threads in parallel using processing modules 142 and merges the results, optionally using processing worker managers 143. Thus, execution engine 140 manages all the execution on different parts of the data. Execution engine 140 also ensures that processing workers 142 receive the correct parts and buffers, that the results are correctly received and routed, and that any processing or buffers no longer useful are discarded. The parallel processing is carried out until all of the received data are processed or, as discussed below, a view is changed. Although three processing modules 142 are shown, execution engine may use another number of processing modules at other times. In some cases, processing modules 142 perform operations for multiple threads and perform only a portion of the operations for a particular thread. For example, if a thread includes a multiply operation followed by an addition operation for a column, one processing module may perform the multiplication, while another performs the addition. Operations performed during processing may include traditional operations such as mathematical operations, joins, flattens, aggregations, group bys and reduces. In addition to traditional operations, user/customer-defined functions may also be processed. In such a case, the customer provides a string (identity and order) of operations desired to be performed during processing at 204.

During processing at 204, the view on display 125 is updated to incorporate received data that has completed processing, via 206. An updated view is provided for the user. Thus, a first section of the received data is used to update the view after the first section completes processing but before a remaining portion of the received data completes processing. In some embodiments, 208 includes execution engine 140 providing the part of the received data that has completed processing to layer container 172. Chart module(s) 180 use the information in layer container(s) 172 to update/provide the view. Updating the view at 208 may include providing results in a table, displaying points/lines or other features having various colors on a map, providing a graph including the data points for which processing is done, and/or otherwise providing to the user a visualization of some portion of the received data. In some embodiments, updating at 206 occurs after a threshold amount of the received data has completed processing. The determination of whether the threshold amount of processing has completed may be performed by execution engine 140 and/or progress tracker 148. For example, after processing is finished for ten percent of the received data, the view is updated at 208. In other embodiments, other and/or additional criteria may be used to determine when the view is updated at 206. For example, after a threshold time, such as one hundred and fifty milliseconds, the view may be updated even if less than ten percent of the received data has finished processing.

As processing continues, the view continues to be updated, at 208. 208 is performed in an analogous manner to 206. For example, this may be accomplished via micro-batching and stream processing. For example, the view may be updated in ten percent increments at 208. In other embodiments, the view may be updated after another threshold time has passed. In other embodiments, some combination of criteria might be used to update the view. Thus, at 206 and 208, the view is progressively updated as received data continues processing. Because the additional update(s) at 208 incorporate more processed data into the view, the view is closer to a final view incorporating all of the processed data after each update. At 206 and 208, therefore, the visualization provided to display 125 is progressively improved to be a more accurate representation of all of the data being processed.

Updating at 206 and 208 may include updates performed in response to new requests from the user (not shown). For example, a user may change the view. Changing the view may include but is not limited to moving to a different portion of a chart/map, zooming in or out on a portion of a chart, request changes to a table being displayed, add a new chart to be shown with those in the current view, request data from another dataset to be displayed and/or request some other change in what is being displayed to the user. In such a case, as part of updating the view, client 120 downloads new data from server 110 as needed, and completes 202, 204, 206 and 208 for the new data. Moreover, in some embodiments, execution engine 140 may discard data unusable in the new view and/or reuse data/processed data that are usable in the new view.

Using method 200 and system 100, improved interactivity and latency may be achieved. For example, reduced latency of processing of data on client 120 may be attained. Because data are processed in parallel, the overall time to finishing the processing is also several times faster. For example, using eight processing workers 142, client 120 can be up to eight times faster in finishing the execution than for serial execution. Because the view is updated during processing of the received data, the latency as viewed by the user of client 120 is also reduced. For example, processing of one million data points may require a significant amount of time even when performed in parallel. Using execution engine 140, client 120 can update the visualization as processing of parts of the data is completed. Thus, processing/visualization latency is reduced. Because a user is more rapidly able to view the results of processing, interactivity is improved. Moreover, a large number of data points may be received by client 120 for use. This large amount of received data at client 120 allows for very high resolution views of the received data. Time-based, three-dimensional and/or other visualizations may be provided, layers may be overlaid, data may be controlled on a columnar basis, tiered caching may be provided and a high degree of scaling may be achieved using a platform agnostic system. The user may also interact with the data, changing views of the data and performing some analysis using data already at client 120. Because method 200 may discard or reuse data, the efficiency of processing such changes is improved and latency reduced. Further, a round trip penalty between server 110 and client 120 may be more readily avoided because a large number of data points are loaded on client 120. Load latency may thereby be reduced. Thus, high resolution visual exploration may be facilitated. These features may be achieved at a cost savings by offloading the processing described above to client 120. Method 200 and system 100 may also be extended to include custom graphic libraries, advanced analytic algorithms and other features. Server 110 and client 120 are also scalable. For example, if system 100 and method 200 are used in conjunction with larger datasets, additional workers 142 and/or 152 may be instantiated to process data without significantly increasing latency or requiring additional numbers of processors 122/124 for processing data. Thus performance of system 100 and method 200 for large datasets is improved.

Figure 3:
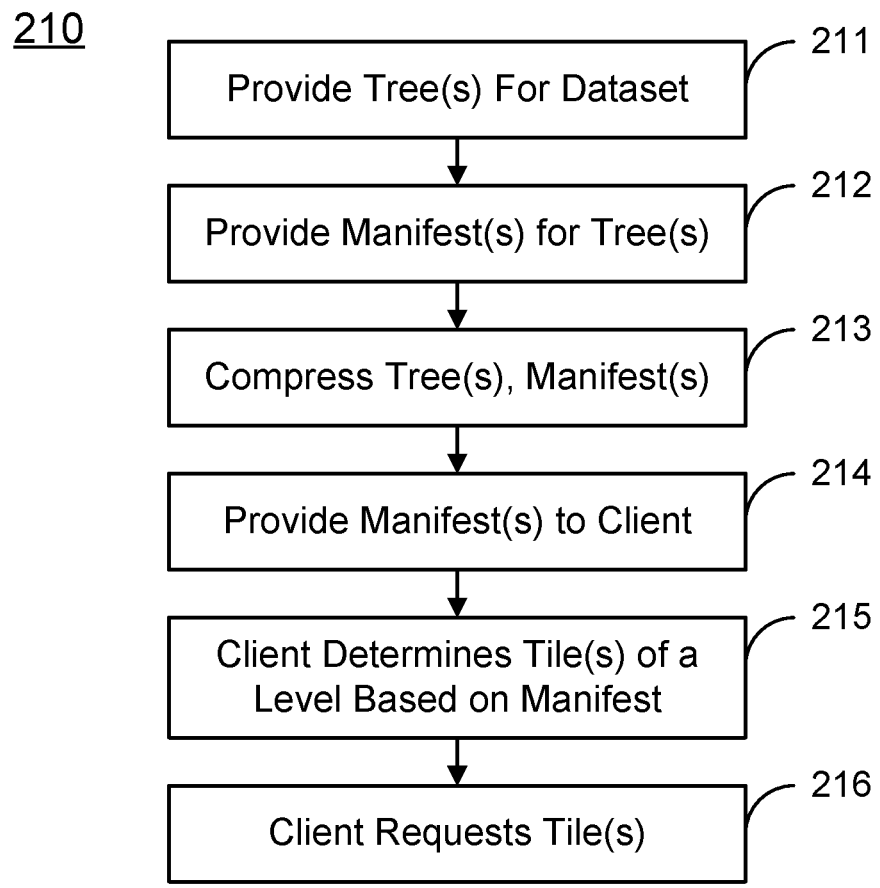
FIG. 3 is a flow chart depicting an embodiment of a method for providing explorable visual analytics having reduced loading and processing latency for very large datasets.

FIG. 3 is a flow chart depicting an embodiment of method 210 for providing a large dataset for analyzing and visualizing the data. For simplicity, method 210 is described in the context of system 100. However, method 210 may be used in conjunction with other architectures. Method 210 is explained in the context of a single dataset. However, method 210 may be extended to multiple datasets which might be joined. For example, demographics data for one dataset may be joined with sales data from another data set for analysis and visualization.

One or more trees corresponding to the dataset are generated, via 211. Pre-processing engine 130 of server 110 builds the tree(s) at 202 for a dataset stored by datastore 102. Each tree provided at 211 has multiple levels based on the columns to which the dataset is indexed. The total number of levels in the tree is based upon the number of data points in the data set and the client resources of client 120 used in loading data. Thus, the number of levels in a tree and the maximum number of data points, described above, may be based on an estimate of how much data a representative client can load in a given amount of time. For example, a two to three year old laptop is generally capable of loading two to three million data points quickly. Consequently, the number of levels may be based on two to three million data points. For similar reason, the maximum number of data points may be selected not to exceed two or three million data points. In an alternate embodiment, the maximum number of data points and number of levels in a tree may be tailored to each client or to sets of clients. Other considerations, such as available disk spacer on server 110 and amount of time pre-processing can be run, can be used in determining levels of a tree.

Each level of the tree has at least one tile. The base, or root, level, or node, has a single tile. Subsequent levels have more tiles. For example, the tree formed at 211 may be a binary tree in which each tile on a particular level gives rise to two tiles on the next level, quad-tree in which each tile on a particular level gives rise to four tiles on the next level, an octo-tree in which each tile on a particular level gives rise to eight tiles on the next level, or another type of tree. The data points at each level of the tree are organized into the tiles. All of the data points in the data set are stored in the tree.

The levels of the tree built at 211 may be based on sampling or aggregation. In some embodiments, multiple trees are used in order to provide the desired visualizations to users of client 120. Because sampling and aggregation provide a different amount of detail at different levels of the tree, the levels of the tree formed at 211 may also be considered to be zoom levels for viewing data on client 120. For example, data for a root level or data for the leaf (deepest) level might be rendered on client 120. Data for the root level provides a less detailed view of a portion of the dataset than data for the deepest, leaf level. Thus, the zoom level may be the highest for visualizations of the leaf level and the lowest for the visualizations of the root level.

The levels of the tree may be sampling levels. In some embodiments, pre-processing engine 130 provides a random sampling for each sampling level of the tree. For example, suppose a dataset includes one billion points and that may not organized into a hierarchy. The deepest (leaf) level of the tree includes all one billion points spread over multiple tiles. The root level might include one million points sampled randomly from the one billion points, for a sampling ratio of 1:1000. In some embodiments, the sampling ratio for the root level is defined such that not more than a maximum number of data points are stored at the root level. In some embodiments, this maximum number of data points is predetermined. For example, a user may be allowed to select one million, two million, or three million as the maximum number of data points. Such a selection could be based upon the user's knowledge of the client resources for client 120. In some embodiments, the maximum number of data points is based on the most data points loadable onto client 120 within a specified amount of time. This may be determined by querying the user's system or based on an estimation of the resources available for most clients. The maximum number of data points may be a default number. Such a default maximum number of data points may be determined by estimating the largest number of data points expected to be loadable on an average client machine in a particular time. When rendered on client 120, data for the deepest level of the tree provides a more accurate view of the data set (higher zoom/1:1 sampling ratio) than data for the root level of the tree (lower zoom/lower sampling ratio). In some embodiments, a tree may have optional additional single-tile level(s). Stated differently, the root node of the tree has one or more single parent nodes in such embodiments. Such parent nodes are highly sub-sampled version of the root node. This structure is useful when the number of data points at a root is still very large-potentially greater than the maximum number of data points. In those cases, the sub-sampling parent nodes can be used for analytics and visualization.

The levels of the tree may be based on aggregation levels. Aggregation levels are based upon a logical hierarchy inherent to the dataset. For example, the dataset might include United States' census data that is indexed based on geographic location (e.g. latitude and longitude). The hierarchy for census data includes census blocks (most granular/highest level of detail), tracts (including a number of blocks/next most granular), counties (including tracts) and states (including all counties/least granular). In such a case, the levels of the tree may correspond to populations of census blocks, tracts, counties, states of the entire country. When rendered on client 120, data for blocks provides a more accurate view of the population over a smaller area (higher zoom/further from root level of the tree) than data for the states (lower zoom/at the root level of the tree). Other hierarchies indexed in other manners may be present in other datasets. For example, a dataset for air travel may include the following aggregation levels: individual passengers (most granular level), flights (including some of the passengers/next aggregation level), domestic airlines (including sets of flights) and all airlines (including domestic and international airlines). For such a dataset, the tree may include at least four levels corresponding to the four aggregation levels.

For some datasets, visualizations may be desired for both sampling and aggregation of the dataset. In some such embodiments, multiple, related trees are generated by pre-processing engine 130. In such an embodiment, a tree is generated based on sampling as discussed above. The raw data can then be aggregated to form a new, related dataset and separate sampling trees built for different aggregation levels of the aggregated raw data. Client 120 can iterate over these trees for the related datasets and show the data at different levels of different aggregation. Stated differently, client 120 can move from one sampling tree to another so that the user can intuitively navigate within the data across different aggregation levels, each provided from a layer of a different sampling tree for different aggregation levels. For example, in the census example above, one tree that is based on zip codes may be generated. Data for the zip codes can be aggregated to create a new raw dataset based on counties. A second tree based on these counties can be created. In either tree, the leaf layer (deepest layer) corresponds to the 1:1 sampling of the data and the upper layers (closer to root) correspond to a sampling of the data. The system can navigate within a tree (which in this case, zooming is equivalent of navigating across different sampling layers) or between multiple trees (which in this case, zooming is equivalent of navigating across different aggregation layers).

Pre-processing engine 130 creates a manifest for each tree, at 212. The manifest indicates a particular number of data points in each tile for each level of the tree. The number of data points per tile is provided because the data points may not be evenly distributed across the tiles of a level. In the census example above, tiles corresponding to counties may have very different numbers of data points. A county including an urban area, such as New York City or Chicago, may have a significantly larger number of data points than a rural county. Thus, tiles including New York City or Chicago in the level of the tree for counties have many more data points than tiles including rural counties. The manifest for the tree indicates this difference between tiles. However, the manifest occupies significantly less storage than the tree. A tree stores the data for the data points in tiles at each level. The manifest stores the number of data points in each tile in each level of the tree.

Pre-processing engine 130 may also provide other metadata for the dataset as part of 211. For example, the metadata might include the name of each column, unit of time for each time interval (discussed below), any change in schema between levels of the tree, statistics for each column, (based on column types such as min, max, sum, average, standard deviation for numeric columns, count distinct for string columns, etc.), other data that may be used in each visualization and/or other metadata desired.

Each tile of each tree is compressed, at 213. In some embodiments, the tree is compressed in a binary format to provide a binary memory. Such a binary memory could be more efficiently sent to client 120 via bulk server 134. The manifest for the tree may also be compressed at 213. Sending the data in this binary format avoids deserialization on by client 120. Client 120 can directly load these binary tiles into its memory and then access each row of the data. Because binary format is used, this deserialization is unnecessary and a significant amount of processing time may be saved.

The manifest(s) are provided to client 120, via 214. To do so, bulk server 134 sends the manifest(s) to client 120 via network 104. Generally 214, 215 and 216 (discussed below) occur during live usage of client 120, while 211 and 212 occur during pre-processing, which may occur at another time. The manifest for the tree may also be made into a binary format and compressed at 214. Sending the data in this binary format avoids deserialization by client 120. Client 120 can directly load these binary tiles into its memory and then access each row of the data. Because binary format is used, this deserialization is unnecessary and a significant amount of processing time may be saved. Consequently, client 120 can use the manifest to understand the structure of the tree and request data from server 110. Sending the manifest at 214 is analogous to part of 202, receiving part of the dataset at 202 of method 200. Thus, client 120 can make use of the manifest in obtaining data from server 110. In pass-through mode, however, column metadata (e.g. names, types, and statistics) are sent to client 120 in lieu of the manifest. More specifically, a user of client 120 may desire to visualize, perform analytics on or otherwise utilize a portion of the dataset stored in datastore 102. Client 120 determines, based on the manifest, the level and tiles of the tree that correspond to the desired portion of the data and that have the largest number of data point consistent with client resources. To be consistent with client resources, the amount of data loaded includes not more than a maximum number of data points. In some embodiments, the maximum number of data points corresponds to the most data loadable by the client in a particular amount of time. This maximum number of data points may be determined by querying the client, detecting the client's device type and running simple benchmarks, by user input, by default or in some other manner. In some embodiments, the maximum number of data points may be one million data points. In other embodiments, the maximum number of data points may be two million data points. In other embodiments, the maximum number of data points might be three million data points. Thus, the manifest is used in determining the level and tile(s) of the tree that correspond to the desired portion of the dataset and have the largest number of data points not exceeding the maximum number of data points. These are the tile(s) that client 120 requests.

Dataset module 150 determines, based on the manifest, the desired level and tile(s) of the tree that include the desired portion of the dataset, at 215. Because the manifest provides the number of data points per tile in each level, the number of data points in the level and tile(s) determined at 215 is known. In some embodiments, the number of data points in the tile(s) determined at 215 is maximized given the structure of the tree and limitations on client resources.

Download manager 150 requests the tile(s) identified by dataset module 150, at 216. In response to the request, server 110 provides the requested tile(s) to client 120. Thus, entire tile(s) are sent from server 110 to client 120. In an alternate embodiment, client 120 may request and receive sections of data that are smaller than whole tiles. Because of the use of the manifest, client 120 may download and use the data in the tile(s) efficiently. In pass-through mode, the client does not use the manifest and instead uses the column metadata to query datastore 102. The compressed tile(s) identified in the request are then provided to client 120, at 215. Thus, client 120 may more efficiently obtain the data in the appropriate tile(s).

Figure 4:
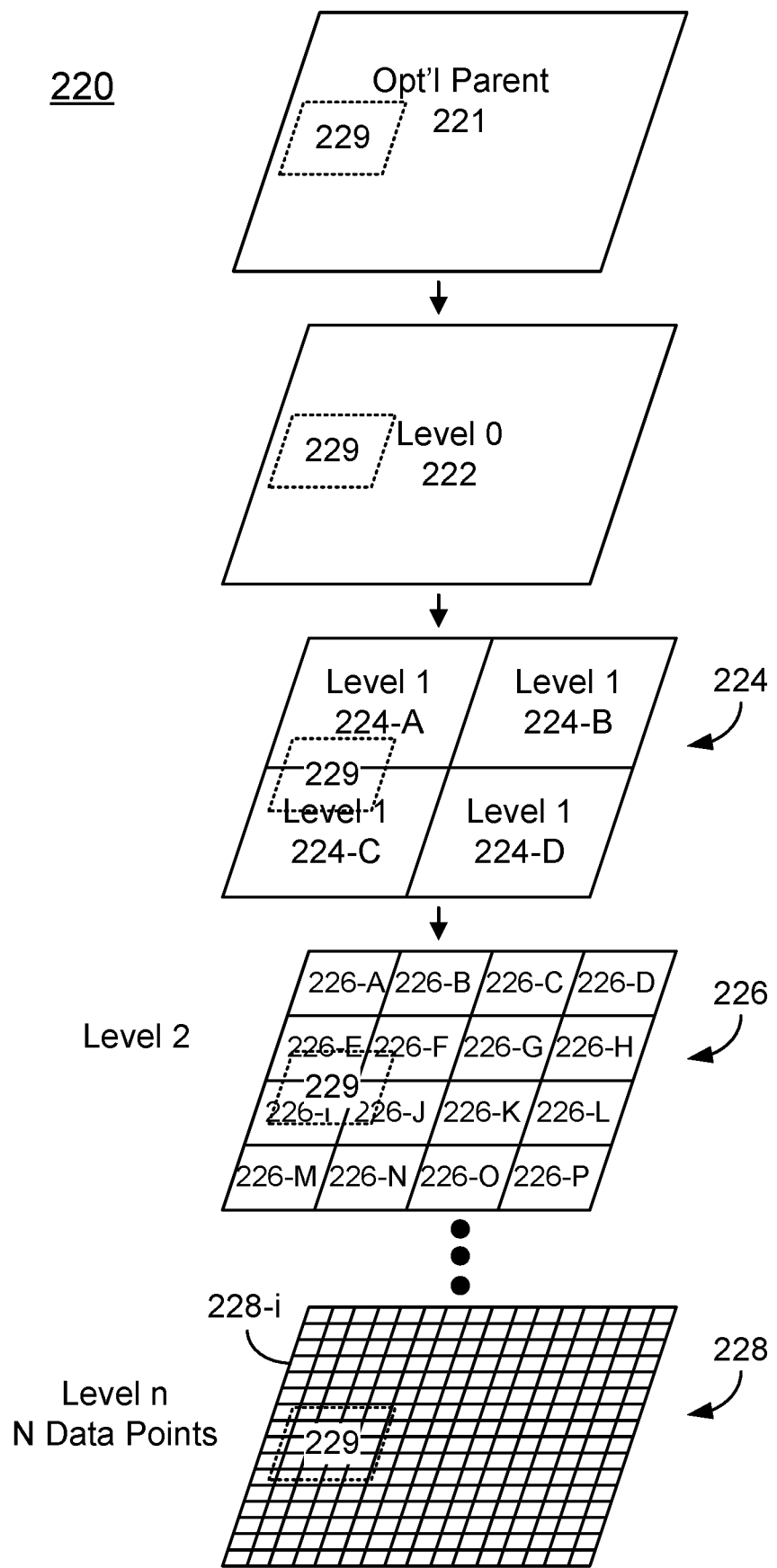
FIG. 4 is an embodiment of a tree provided using a method for providing explorable visual analytics having reduced loading latency for very large datasets.

For example, FIG. 4 depicts an embodiment of a tree 220 that is formed at 211 of method 210. Although shown as a quad tree, in other embodiments, tree 220 might be another type of tree. The root level, level zero 222, has a single tile and may hold the fewest number of data points. Level one 224 has four tiles 224-A, 224-B, 224-C and 224-D. Level one 224 typically has a larger number of data points than level zero 222. Level two 226 has sixteen tiles 226-A, 226-B, 226-C, 226-D, 226-E, 226-F, 226-G, 226-H, 226-I, 226-J, 226-K, 226-L, 226-M, 226-N, 226-O and 226-P and generally includes a larger number of data points than level one 224. This increase in tiles per level continues to the leaf level 228 having the largest number of tiles 226-$i$, only one of which is labeled for clarity. Level 228 also generally includes the largest number of data points. As discussed above, levels 222, 224, 226 and 228 may represent different aggregation or sampling levels for the corresponding dataset. Also shown in FIG. 4 is optional parent level 221. One or more parent levels may be provided if, for example, root level 222 has a larger number of data points than desired. Parent node 221 includes a single tile and is a super-sampled version of root level 222. In other cases, parent node 221 is unnecessary and thus omitted.

As discussed above, each level of tree 220 is organized into one or more tiles. A tile can include zero or more parts for processing by client 120. In general, the division of a tile into parts for processing in parallel on client 120 is performed at server 110. However, in an alternate embodiment, splitting tile(s) into part(s) for processing by carried out by dataset module 160 and/or execution engine. For example, root node 222 of tree 220 includes one tile that may have one million data points. Processing all one million data points at once and in one processing worker 144 is time consuming and, therefore, undesirable. Consequently, the tile 222 of root node 222 may be broken down into twenty parts, each of which includes fifty thousand data points. Each part of tile 222 is processed separately. The number of parts in a tile and whether the tile includes parts at all may be determined when the tree 220 is generated. Consequently, although not explicitly depicted in FIG. 4, one or more of the tiles in each level 221, 222, 224, 226 and 228 might include multiple parts.

A manifest for tree 220 is generated at 212. Tree 220 is compressed at 213 and the manifest provided to client 120 at 214. Using the manifest, dataset module 160 determines the tile(s) and level of tree 220 having the desired portion of the dataset at 215. Client formulates a request for the tile(s) at 216 and receives the desired portion(s) of tree 220 in response to the request.

Using method 210 and system 100, client 120 may obtain data organized into a tree. Using the data organized by server 110 allows client 120 to realize the benefits of method 200. For example, reduced latency of processing of data on client 120 as described with respect to method 200 may be achieved. Improved interactivity and scalability may also be attained. In addition, load latency may be improved. This is achieved by using the manifest to identify and request tile(s) including to a desired portion of the dataset.

Figure 5:
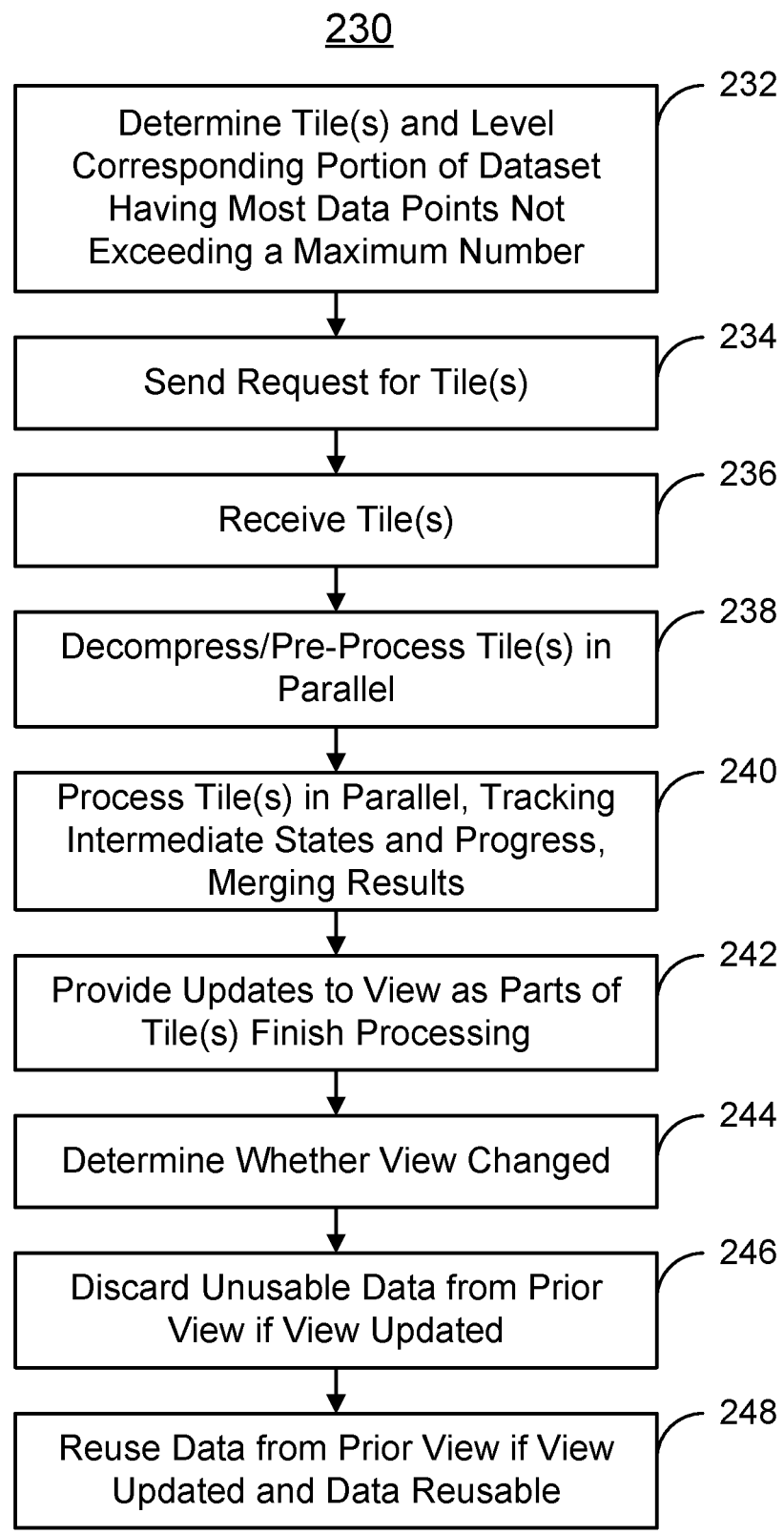
FIG. 5 is a flow chart depicting another embodiment of a method for providing explorable visual analytics having reduced processing latency for very large datasets.

FIG. 5 is a flow chart depicting an embodiment of method 230 for analyzing and visualizing a large dataset with reduced processing latency and reduced load latency. For simplicity, method 230 is described in the context of system 100. However, method 230 may be used in conjunction with other architectures. Method 230 is explained in the context of a single dataset. However, method 230 may be extended to multiple datasets which might be joined. For example, demographics data for one dataset may be joined with sales data from another data set for analysis and visualization. The desired portion of the dataset to be viewed is known at the start of method 230.

Dataset module 150 determines, based on the manifest, the level and tiles of the tree that correspond to the desired portion of the data and that have the largest number of data points consistent with client resources, at 232. To be consistent with client resources, the amount of data loaded includes not more than a maximum number of data points. In some embodiments, the maximum number of data points corresponds to the most data loadable by the client in a particular amount of time. This maximum number of data points may be determined by querying client 120, by user input, by default or in some other manner. In some embodiments, the maximum number of data points may be one million data points. In other embodiments, the maximum number of data points may be two million data points. In other embodiments, the maximum number of data points might be three million data points. Thus, the manifest is used to determine the level and tile(s) of the tree that have the desired portion of the dataset and the largest number of data points not exceeding the maximum number of data points.

Download manager 150 requests the tile(s) identified by dataset module 150, at 234. In response to the request, server 110 provides the requested tile(s) to client 120. Thus, download manager 150 receives the requested tile(s), at 236. Step 232, 234 and 236 are analogous to step 202 of method 200. The tile(s) received are processed in parallel using download manager 150 and data preparation workers 152, at 238. Thus, a number of data preparation workers 152 may be provided, portions of the tile(s) queued for processing, and the tile(s) unpacked, uncompressed and otherwise pre-processed for use at client 120. Download manager 150 may also control the download rate for different data types, prioritizing certain data types over others or downloading some portions of the data faster than other portions based on a determined priority. Download manager 150 may also ensure that duplicate requests by different modules are not overlapped and the data is only downloaded once.

Using execution engine 140, the tile(s) are processed in parallel at 240. Execution engine 140 provides parts of each of the received tile(s) to processing modules 142 to be processed in multiple threads, processes the threads in parallel, tracks intermediate states and merges the results, using processing modules 142. Further, processing in the threads is performed such that any hierarchy of the operations and data dependencies are accounted for. Execution engine provides a number of processing modules 142 to perform the operations using processing workers 144, track and merge results using processing worker managers 143. In some cases, multiple processing modules 142 perform operations for which intermediate results, or states, are tracked and merged. For example, a sum of all of the data points in all of the tiles received involves multiple summations on data points for the parts of each tile. A summation for a part is an intermediate state for the sum operation. The sum for each part of each tile is tracked and merged with (e.g. added to) summations for other parts of each tile. The summation for each tile is also tracked and merged with the sum for other tile(s) to provide the final result. How processing is progressing may also be tracked as part of 240. In addition, processing may be optimized in 240 such that data are processed once. For example, if in addition to the summation described above, a multiplication is to be performed on the sum for a subset of the tiles, then the summation calculated for those tiles is used not only for the sum of all tiles for but also the addition-multiplication for the subset of tiles. Tracking of progress and intermediate states for execution engine 140 may be accomplished using module 146 and 148. Pre-processing and processing at 238 and 240 are analogous to 204 of method 200.

Updates to the view are provided as processing is completed for part of the tile(s), at 242. In the example above, when the summations for one or more of the parts for the tile(s) is complete, the result may be provided by execution engine 140 to the appropriate layer container 172. For example, chart module 180 may be used to update a graphic visualization. In such a case, a graph may be updated to include the newly processed data or a map may be modified to depict the processed newly data for example as points of a particular color in a corresponding region. If the view is not changed, updates continue to be provided at 242 until processing is complete. After each update, the view provides a more accurate visualization. Updates at 242, 244, 246 and 248 may be considered analogous to 206 of method 200.

It is determined whether the view is changed using group module 170, at 244. In some embodiments, 244 includes receiving from the user a request to change the view. For example, a user may pan to a portion of a map not previously rendered on display 125, may request a new calculation be performed on the data, may request a new graph to be shown, change a zoom level (e.g. zoom in/magnify or zoom out) or otherwise alter the view.

If the view is modified, then some processed and/or unprocessed data from the current view may be discarded, at 246. In some embodiments, step 246 only discards such data if the data cannot be used in the new view. For example, in a map depicting data for the entire state of California, a user may pan to a region including California and Nevada. Data for portions of California not shown in the new view are no longer needed. Processing may be terminated and downloads of data for these portions that are in progress are discarded by download manager 160. In some embodiments, data for portions of California that are still shown but which cannot be used for other reasons, such as the details of the calculation being performed, are also discarded. In other embodiments, all data for the current view is discarded If the view is changed, then processed and/or unprocessed data from the current view may be reused, at 248. It may be determined as part of 248 whether data are reusable. If so, data are retained and reused. In the map example above, data for portions of California that are still shown may be used in addition to (new) data for portions of Nevada. Steps 232 through 248 may be repeated for the new data for Nevada. Thus, unusable data are discarded and reusable data retained for reuse. Consequently, processing efficiency may be improved.

For example, tree 220 of FIG. 4 has a manifest used at 232. Using filters from chart modules 180 and layer containers 172, it is determined that portion 229 (shown in dotted line) of tree 220 includes data desired by client 120. Portion 229 may correspond to a particular geographic area (e.g. latitude and longitude) in the census data example above. Suppose the maximum number of data points loadable on the client is one million data points and the manifest for tree 220 indicates that: root level zero 222 includes four hundred thousand data points; level one 224 includes 1.6 million data points with four hundred thousand data points per tile 224-A, 224-B, 224-C and 224-D; level two 226 includes 6.4 million data points with four hundred thousand data points in each tile 226-A through 226-P; and subsequent levels include more data points. Although each tile includes the same number of data points in this example, the tiles may include different numbers of data points. Suppose also that tiles are downloaded in their entirety. As is indicated in FIG. 4, tile/level 222; tiles 224-A and 224-C at level 224; tiles 226-E, 226-F, 226-I and 226-J at level 226; or a number of tiles 228-i at level 228 correspond to the portion 229 of the data. Based on the manifest and portion 229 of the data, it can be determined that the tile for level zero 222 includes less than the maximum number of data points. Thus, the four hundred thousand points in tile/level zero 222 might be loaded. Tiles 224-A and 224-C together have eight hundred thousand data points. This is more data points than for level zero 222 but less than the maximum number of data points. Tiles 226-E, 226-F, 226-I and 226-J together have more than one million data points, which exceeds the maximum number of data points. Thus, using the manifest for tree 220, tiles 224-A and 224-C would be identified at 232 as having the largest number of data points not exceeding the maximum number of data points and that corresponds to portion 229 of the data. A request for tiles 224-A and 224-C is sent by client 120 at 234. Tiles 224-A and 224-C would be received by client 120 and processed as described above.

Suppose the view is determined to have been changed at 244. As shown in FIG. 4, the view is changed to dashed region 229'. Portion 229' is included in tiles 224-C and 224-D. Thus, tile 224-D is identified, requested, downloaded and processed at 232, 234, 236, 238 and 240. All of the data from tile 224-A is unusable for region 229' and is discarded at 246. However, as can be seen by the overlap between 229 and 229', some data from tile 224-C may be reusable. This data is reused for the new view at 248.

Using method 230 and system 100, the benefits of method 200 may be achieved. Thus, interactivity may be enhanced, scalability facilitated and processing latency reduced for high resolution views of large datasets. Discarding of unusable data and reuse of data that can be reused further improves processing efficiency. Because the manifest and tree are used and because data provided form server 110 are in binary format, columnar and compressed, a reduced load latency may also be attained. Thus, performance of system 100 and method 230 may be improved.

System 100 and methods 200, 210 and 230 can be extended for datasets associated with multiple intervals, such as time. In the census example above, population or demographics data may be obtained for each year. In a dataset related to finances of a company, the dataset may include yearly, monthly or daily sales data for a store or division. A user may desire to compare, visualize or otherwise utilize data for different intervals that are for the same geographic area, store, or division. Consequently, a mechanism for accounting for intervals, such as time, is desired.

Figure 6:
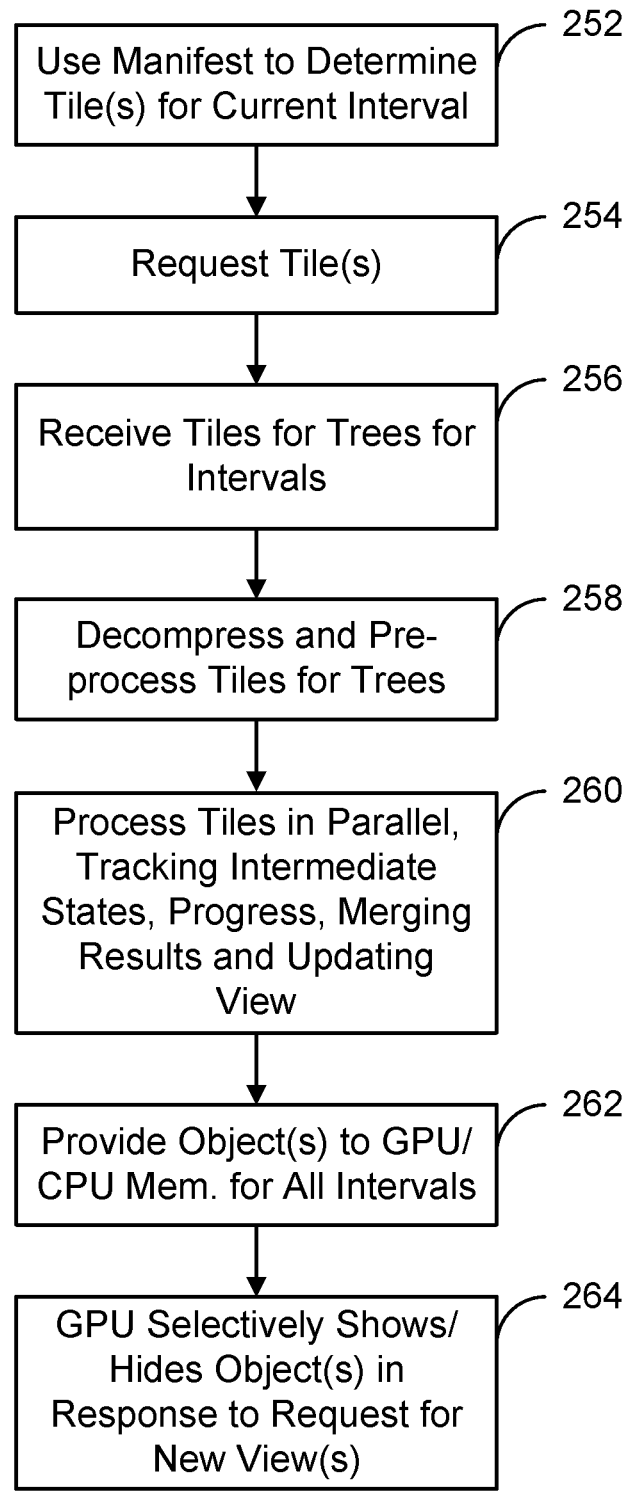
FIG. 6 is a flow chart depicting another embodiment of a method for providing explorable visual analytics having reduced processing latency for very large datasets having multiple intervals.

FIG. 6 is a flow chart depicting an embodiment of method 250 for analyzing and visualizing a large dataset including multiple intervals. For simplicity, method 250 is described in the context of system 100. However, method 250 may be used in conjunction with other architectures. Method 250 is also described in the context of time intervals. However, nothing prevents the use of method 250 in connection with other types of intervals. Method 250 is explained in the context of a single dataset. However, method 250 may be extended to multiple datasets which might be joined. For example, demographics data for one dataset may be joined with sales data from another dataset for analysis and visualization.

Figure 7:
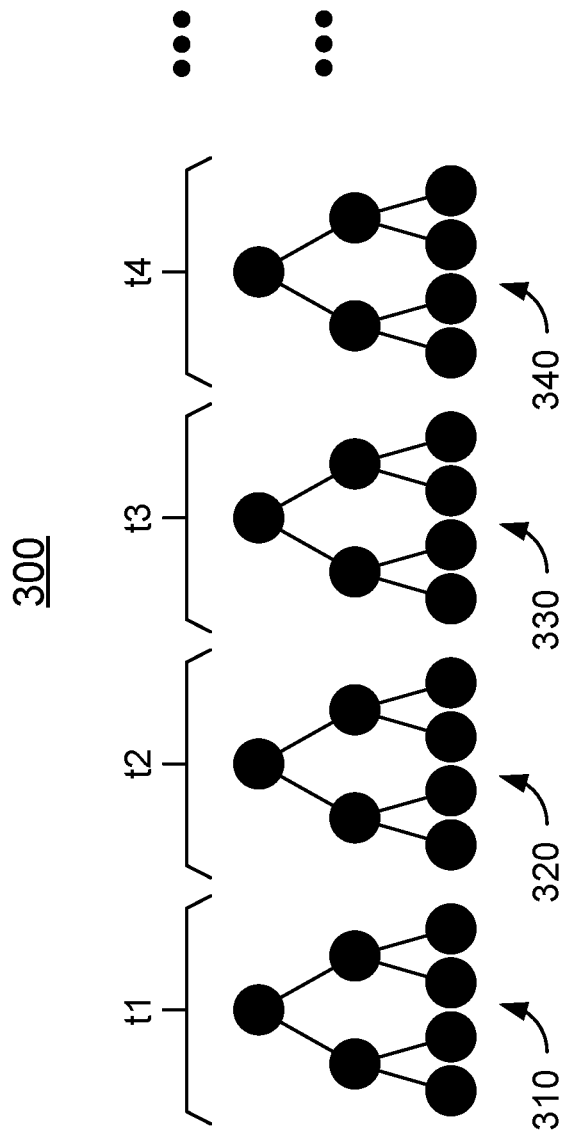
FIG. 7 is an exemplary embodiment of trees provided using a method for providing explorable visual analytics having reduced loading latency for very large datasets having multiple intervals.

Method 250 may be considered to commence after trees for intervals have been provided by server 110. In general, the intervals are defined by the dataset. For example, for demographics data obtained yearly, each interval may be a year. Other time intervals might be used in other embodiments. FIG. 7 depicts an embodiment of a set 300 of trees provided for multiple time intervals. In the embodiment shown, each tree corresponds to a particular interval. Tree 310 is for time interval t1; tree 320 is for time interval t2; tree 330 is for time interval t3; and tree 340 is for time interval t4. Trees for other time intervals are not depicted for simplicity. Each tree 310, 320, 330 and 340 includes three levels and is a binary tree. In other embodiments, another number of levels and/or other types of trees (e.g. quad trees or octo-trees) might be formed. Although not shown in FIG. 7, trees 310, 320, 330 and 340 may include parent level(s), as described above for tree 220. The trees built at 256 are analogous to those built at 211. Thus, the levels may represent zoom, aggregation or sampling levels. The number of levels in the trees may also be determined based on the total number of data points and the client resources of client 120. Each tree also has a corresponding manifest (not shown in FIG. 7). The trees and manifests are also compressed by server 110. Prior to method 250, the manifests for trees 310, 320, 330 and 340 are received at client. In addition, metadata of different (but related) datasets for trees 310, 320 and 330 are combined in one JSON file and sent to client 120. Client 120 uses this metadata to navigate between different aggregation levels, even though technically each one of the aggregation levels is a different dataset having its own manifest and tiles/trees. For a pass-through mode, manifests are not sent to client 120, as discussed above. In such an embodiment, compression at 206 may be completed on the fly in response to requests from client 120.

In addition, although not described in the context of method 250, client 120 can be queried to determine the limitations on the number of data points loadable in a specified time and the number of manifests that are loadable. The number of data points loadable at a time is determined by the amount of RAM and the capabilities of GPU(s) 124 and/or CPU(s) 100. The number of manifests loadable is determined by the amount of RAM available. The number of loadable manifests determines how many trees can be queried at each time. This affects the maximum range of time for which data can be loaded. For example, for the census data, one tree may be created per year. Based on client resources, only three manifests might be loaded at a time. Consequently, only three years of the data can be loaded on client 120. However, the user can "move" the viewable time range for the data. For example, instead of looking at the data from 2010 to 2012, a user can move it to 2009 to 2011. Now within a time range (three years/intervals in this example), there is still a maximum number of loadable data points, such as 1 million. In this example, for the three years the user is exploring, tiles from the same level of three different trees, each corresponding to one year can be loaded. Thus, the total number of points loaded in all those tiles remains below the 1 million data point threshold. Querying the client to determine the maximum number of loadable points and also the maximum number of loadable manifests can optionally happen whether a single tree (a single time interval), multiple time intervals and/or multiple trees are generated.

Dataset module 160 of client 120 uses the manifests to understand the structure of the tree for each interval and request data from server 110. Based on the manifests, the level and tiles of the tree that correspond to a desired portion of the data for a particular time interval and that have the largest number of data point not exceeding the maximum number of data points is determined, at 252. A request for the tile(s) is provided by download manager 150 to server 110.

The compressed tile(s) identified in the request are then provided to client 120, at 256. In addition, the tile(s) for the corresponding level of other trees for other intervals are also provided at 256. The tiles for the trees for various intervals are uncompressed and pre-processed, at 258. Process 258 is performed in an analogous manner to what is described above. However, priority may be given to the tile(s) for the current view/time interval. The example above in which a client is capable of loading trees for three years, the tree for the current year and two other years in the viewable range are sent to client 120 at 266. Stated differently, the tiles for the current interval (current year viewed) and other intervals (other two years in the viewable range) are sent to client 120 by server 110. In some embodiments, tile(s) in their entirety are sent to client 120 at 266

Parts of tiles for the trees are processed in parallel, at 260. Process 260 is performed in an analogous manner to what is described above. However, priority may be given to the tile(s) for the current view/time interval. The processed tiles for the time intervals are provided to GPU memory 126. The processed tiles may be provided as a single object or as multiple objects. In some embodiments, a binary format version of these tiles may be provided to the GPU(s) 124, which can buffer the tiles for different intervals. For example, the data may be split into multiple binary chunks and provided to the GPU memory. Each binary chunk has many data points inside it that are not translated into individual objects in the system and are kept in the binary format for faster processing and much lower memory overhead. Thus, the processed data for all intervals are available for display. In other embodiments, CPU(s) 122 can be used in addition to or in lieu of GPU(s) 124.

GPU 124 selectively provides the tile for rendering on display 125 in response to requests for new views, at 264. The user may then rapidly and seamlessly navigate between intervals. For example, the user interface (not shown) for client 120 may include a slider corresponding to all of the time intervals in the dataset. After downloading tiles, processing tiles and sending a binary of the tiles to the GPU 124, the user may simply move a slider along a bar to rapidly change the view shown on a client display between time intervals. As the slider moves to new intervals, the GPU(s) 124 selectively renders data for the new interval and hides data for the previous interval. For example, in moving the slider between t1 and t3, tile(s) for tree 310 (t1) are shown first. As the slider moves to t2, tile(s) for tree 310 are then hidden and tile(s) for tree 320 shown. As the slider moves from t2 to t3, tile(s) for tree 320 are then hidden and tile(s) for tree 330 shown. Similarly, the slider can be used to show portions of time within a tree. For example, tree-1 may cover daily data for a week. A user can "zoom in" on the time slider and allocate each frame to one day, which is a smaller timespan than the entire one week that the tree covers. Thus, portions of a tree may also be rapidly viewed. Little or no delay in changing visualizations may be achieved. Thus, a user may be better able to visualize data for different time intervals.

Using method 250 and system 100, the benefits described above for methods 200, 210 and 230 may be achieved. Thus, interactivity, scalability, processing latency and load latency may be improved for high resolution views of very large datasets. In addition, interactivity and latency may be further improved. Because tile(s) for each interval are provided at 266, client 120 may process tile(s) not only for the interval currently of interest, but also other intervals. A user may then rapidly and seamlessly navigate between intervals. This is in contrast to conventional systems that generate multiple data objects on the client. Client 120 may thus have only a one or a few binary memory blocks to render per frame instead of (potentially) thousands of objects. The GPU 124 can render the binary memory on the fly, allowing for millions of points to be loaded at multiple frames per second (e.g. up to 60 frames/sec) without crashing the browser. Thus, viewing latency as well as loading latency for client 120 may be further reduced.

Figure 8:
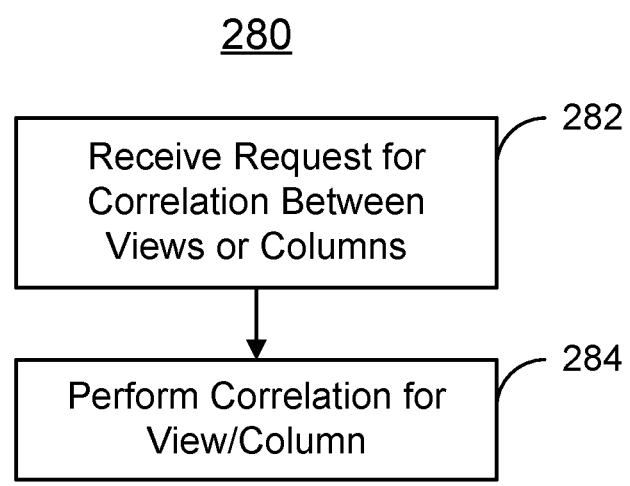
FIG. 8 is a flow chart depicting an embodiment of a method for correlating views or columns in a system for processing of data for explorable visual analytics having reduced processing latency for very large datasets.

FIG. 8 is a flow chart depicting an embodiment of method 280 for correlating views or columns in a system for processing of data for explorable visual analytics having reduced processing latency for very large datasets. For simplicity, method 280 is described in the context of system 100. However, method 280 may be used in conjunction with other architectures. Method 280 is explained in the context of a single dataset. However, method 280 may be extended to multiple datasets which might be joined.

A request to correlate views or columns is received by processor 122, at 282. For example, a user may desire a graph from one view corresponding to one portion of a map to be shown with another view, such as an analogous graph corresponding to another portion of the map. If the views overlap the data is downloaded once. If the views are far apart, the system 100 adjusts for this and loads the data in a way that maximizes the details for all the views without loading unnecessary data between the views (e.g., supporting holes in the view). For example, if a user looking at San Francisco and Chicago, system 100 maximizes the detail for both the view of Chicago and the view of San Francisco. However, client 120 does not load any data in between these views. In addition, if the data is required by both views, the data are loaded and processed once. This allows a user to more easily compare data for two views. A user may also desire to correlate two columns from the same or different datasets. For example, demographics data such as income from one dataset may be joined with sales data from another dataset for analysis and visualization.

The views and/or columns are correlated at 284. Correlating the views may include maintaining the layer container(s) 172 for one view while generating the second view. In the example above, the layer container 172 for the graph is maintained and rendered on display 125. Method 200 may be performed for the second view. This may include providing layer containers 172 for the map and second graph described above. The graphs and map may then be rendered together on display 125. To correlate columns at 284, the columns are indexed together. In some cases, the columns may not share an index. This may occur for column from different datasets. In such a case, the columns may be reindexed to a common key. In the example above, income data may be indexed to latitude and longitude. Sales data may be indexed to particular stores. In such a case, the sales data for a store may be reindexed to latitude and longitude corresponding to the store. The correlated columns of data may then be visualized together using method 200, 210, 230 and/or 250. Thus, usability of system 100 may be improved.

Figure 9A:
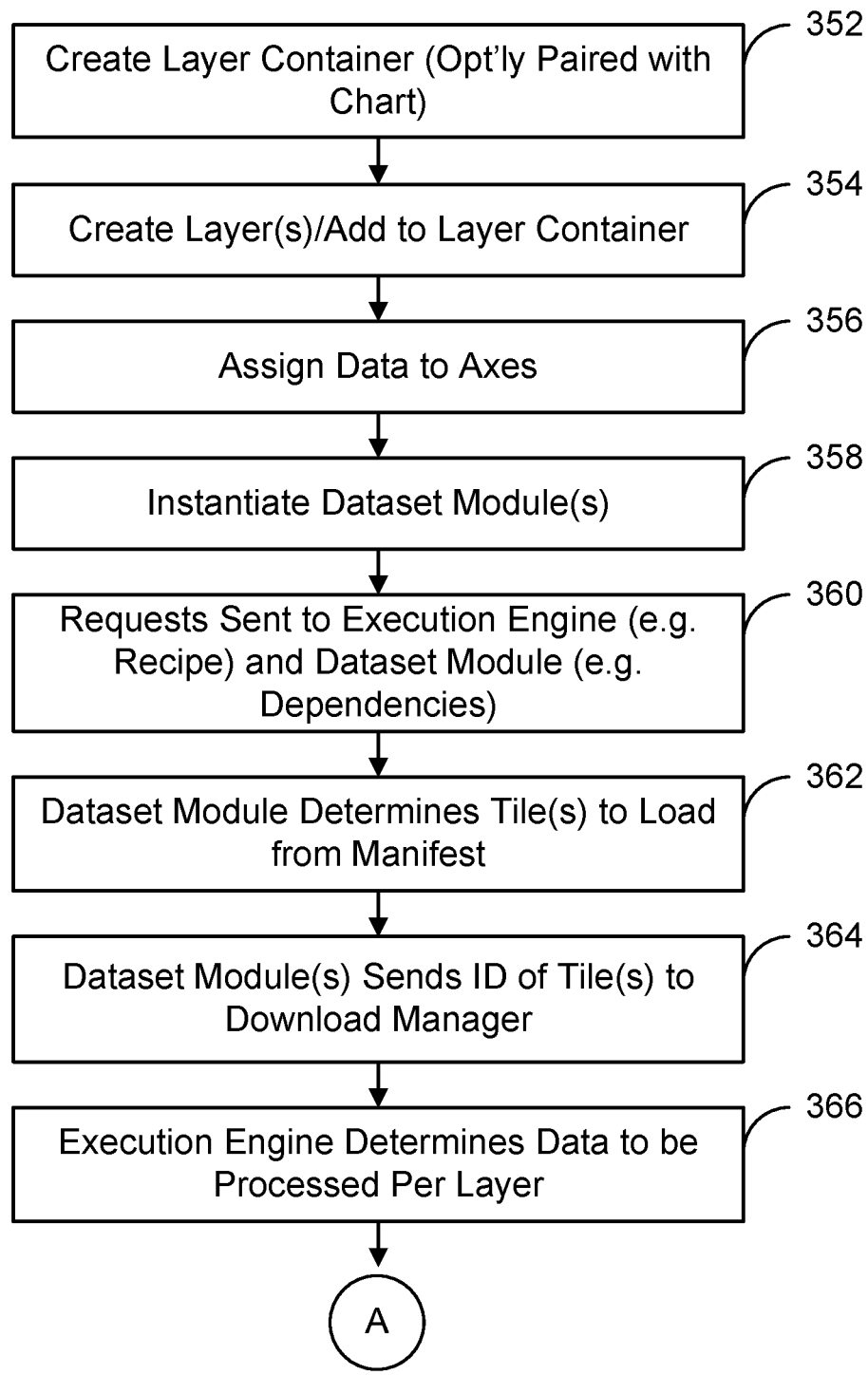
FIGS. 9A-9C are flow chart depicting an embodiment of a method for performing explorable visual analytics having reduced processing latency for very large datasets.
Figure 9B:
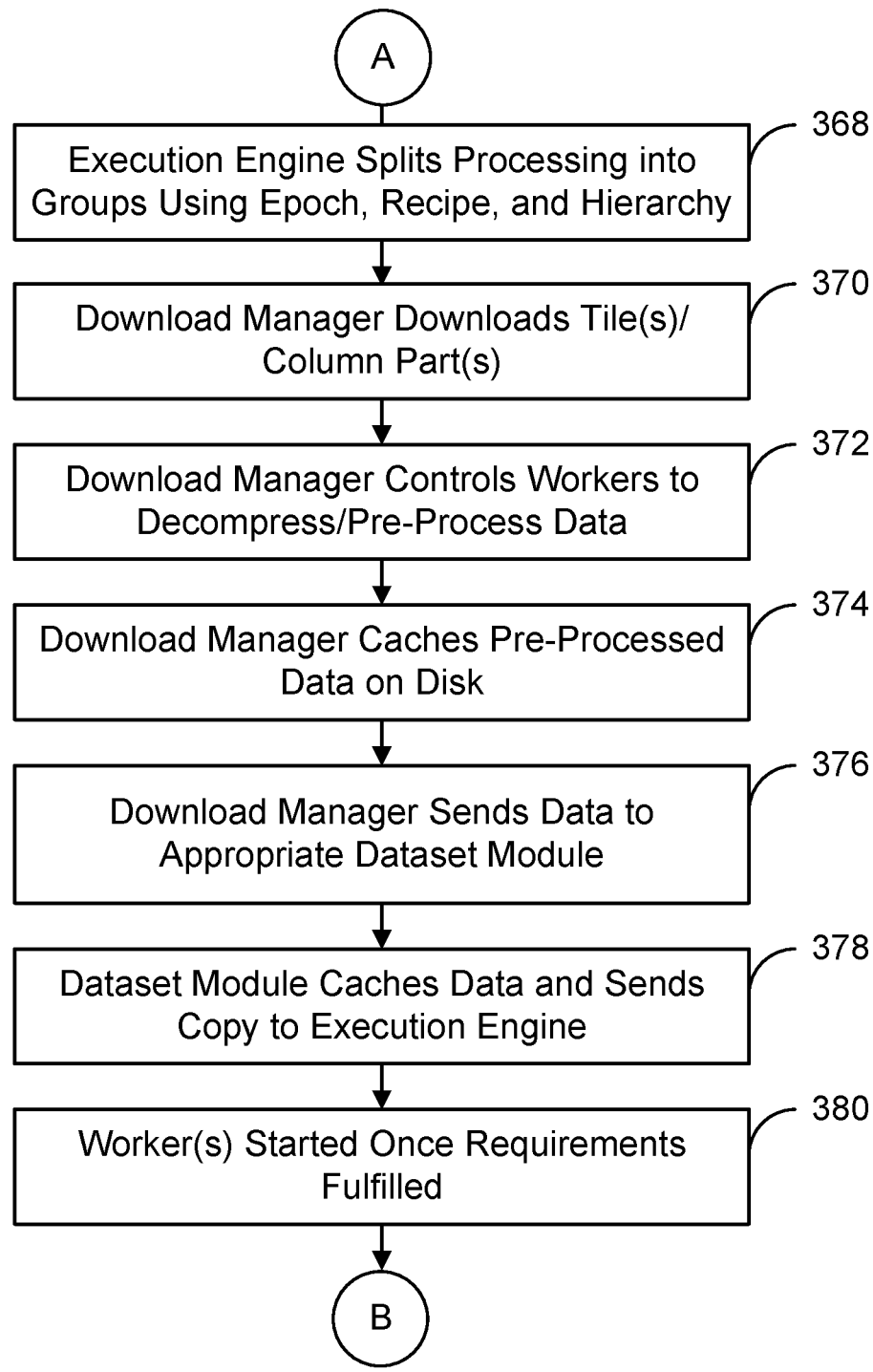
Figure 9C:
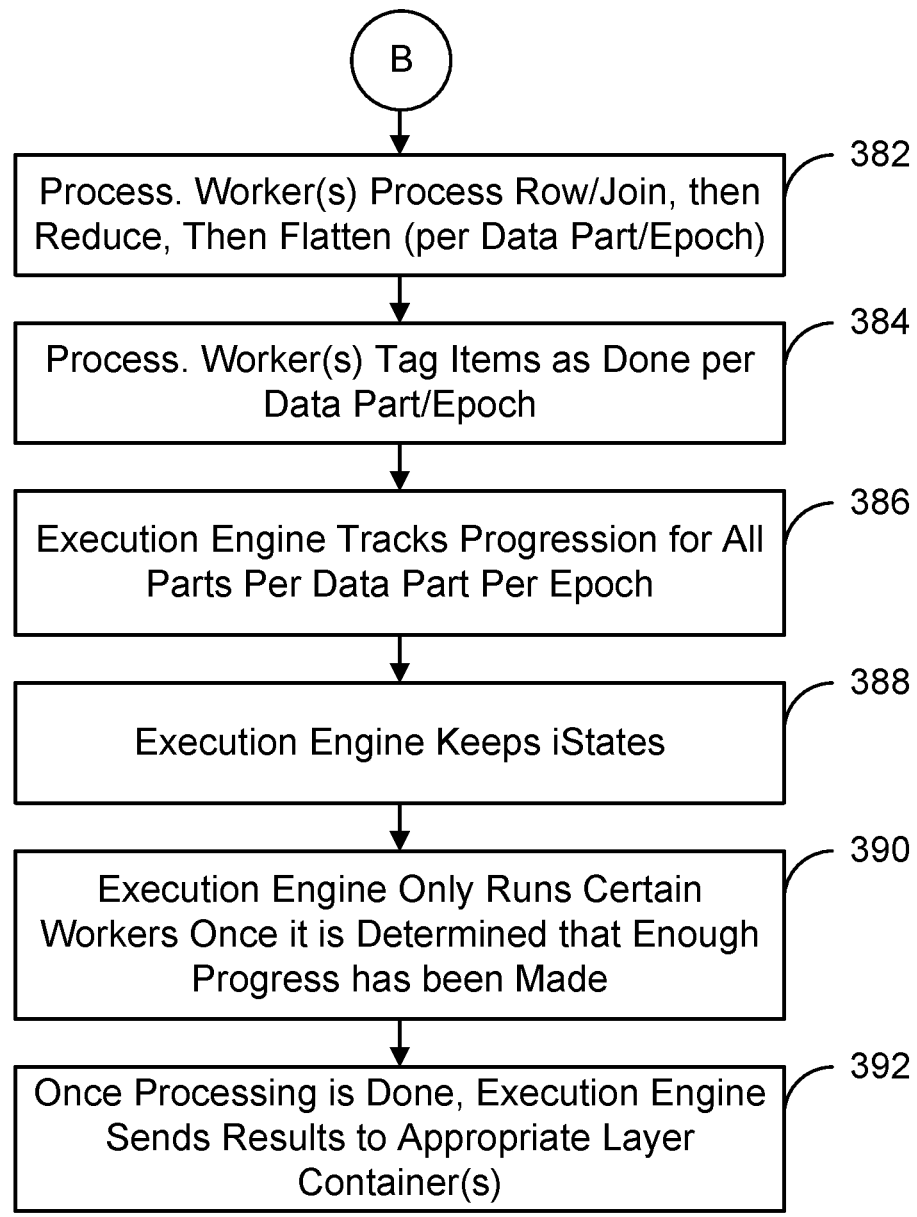

FIGS. 9A-9C depict a flow chart depicting an embodiment of method 350 for performing explorable visual analytics having reduced processing latency for very large datasets. For simplicity, method 350 is described in the context of system 100. However, method 350 may be used in conjunction with other architectures. Method 350 is explained in the context of a single dataset. However, method 350 may be extended to multiple datasets which might be joined.

Method 350 may be considered to start after server 110 has provided files 132 for the dataset. Thus, the dataset(s) used for the method 350 are columnar. Trees and manifests have also been built if server 110 is not being used in pass-through mode. Execution engine 140, download manager 150 and dataset module 160 have been provided on client 120. The dimensions, or unit of computation, and hierarchy between dimensions for method 350 and system 100, have already been determined. The type of dimensions and hierarchy between dimensions affects the order in which operations are performed, which operations are performed, what inputs particular operations can accept and the results provided. Although particular dimensions and hierarchies are used herein, nothing prevents the use of other dimensions and hierarchies.

The dimensions include the dependencies, the functions used and the arguments for the functions. For example, the dependencies may include the columns of the dataset and/or other dimensions as a particular computation may depend upon the data being processed and previous operations performed. The arguments include mathematical and other operations such as multiply, sum, average and topK. The arguments include the specifics for the computation, such as multiply by 2 (for the multiply operation), top5 (return the top five answers for the topK operation). In some embodiments, the dimensions include: a row dimension that performs a read, performs a mathematical operation such as a multiply to all entries and returns the results; a group by dimensions returns data grouped by a particular key such as the year of the data; a reduce dimension that uses a group by and calculates a simple reduce (such as sum or count, etc), flatten dimension which generates a list, and a join dimension that correlates two previously uncorrelated columns. In other embodiments, other or additional dimensions may be defined. The reduce dimension involves intermediate states because of the use of multiple operations (group by and simple reduce). Because of the hierarchy mentioned above, each type of dimension can depend on certain types of dimensions. The hierarchy determines which processing modules 142 process the dimensions, the type of results generated and the order in which the processing takes place so that the correct results are used by the proper dimensions in the correct workers. Further, in addition to traditional operations, user/customer-defined functions may also be processed. In such a case, the customer provides a string (identity and order) of operations desired to be performed.

Layer container 172 for the view is created, at 352. A particular view includes multiple layers, each of which corresponds to a portion of the data being depicted. A layer container includes all of the layers for the view. Thus, layers (not shown in FIG. 1B) for the container 172 are also determined, at 354. The layers indicate what data and what processing correspond to particular parts of the view. Thus, a recipe, or series of computations, is provided for each layer as part of 354. Particular data are assigned to the axes of the chart, at 356. For example, for a map, the latitude and longitude in the dataset may be assigned to the x and y axes for the display 125.

The dataset module(s) 160 are instantiated by execution engine 140, at 358. In addition, requests are sent by group module 170 to execution engine 140 and dataset module 160, at 360. The request sent to execution engine 140 includes the recipe for each layer. A recipe indicates the data to be processed, the dependencies, the dimensions to be executed and grouped together, the order of operations to be performed and buffers to be used. In its simplest form, the recipe can be a sorted list of dimensions based on the corresponding layer and dataset the dimensions belong to and generated by the group filter. Such recipes can be merged together into more complex recipes in execution engine 140 for the actual execution and then sent to the processing modules 142. There recipes may be merged based on their hash, their dataset, and the epoch (start time of execution). Thus, the recipe indicates how processing is to be carried out by execution engine 140 for the layer. The request for dataset module 160 includes the dependencies and certain filters, such as the range of latitudes and longitudes desired to be viewed by the user. Thus, the data to be processed is provided to dataset module 160.

Using the manifests and filters (e.g. ranges), dataset module 160 determines the tile(s) to load for the dependencies for each layer, at 362. This is analogous to the determinations of the tiles to be requested described above. The identity of the tiles is provided to download manager 150, at 364. Execution engine 140 determines, based on the recipes, the data to be processed for each layer, at 366.

Execution engine 140 groups processing based on information such as when processing starts (epoch), the identity of the recipe, the dimensions (including dependencies, hierarchy of the operations performed etc.), the parts of each tile of the tree being processed and hierarchy of dimensions, at 368. The epoch can be implemented in a manner similar to a counter. Each time execution engine 140 sends a bundle of recipes to processing module 142 for execution, the epoch is incremented. The epoch (among other factors) can be used to identify which recipes can be bundled together. Every time a recipe is sent from group module 170 to execution engine 140, that recipe is stamped with the current epoch. When a processing worker 144 becomes available, execution engine 140 combines multiple recipes and sends them to that processing worker 144. The logic behind what recipes can be combined together depends on several factors. In some embodiments, one such factor is that the recipes in the bundle must all have the same epoch stamp. This ensures that the intermediate states remain synchronous for partially processed jobs.

At 368, therefore, processing is split into threads, which are later merged to provide the final results. The grouping above not only allows for parallel processing, but may also improve efficiency and ensure that merged results are correct. For example, two layers may be desired to be processed for a particular map. The layers may be for the same geographic area and thus may correspond to the same part of data being processed and the same filter. However, processing for the second layer may start at a later time. In order prevent merging of results for these layers, which might result in incorrect results, the epoch is considered when grouping and tracking data. The parts of each tile being processed are also used in the grouping and may allow reuse of data when appropriate. For example, a user may change the view on a map during processing. The new view may include part of the previous view. The processing results for the portion of the map still visible may be desired to be reused. This corresponds to reusing data for the previous view. For certain operations (dimensions), data for this overlap region may be reused. Grouping based on the tile(s) being processed allows data to be reused if appropriate. In addition, some dimensions include intermediate states. For example, a reduce dimension includes intermediate state. Grouping by the dimension also allows intermediate states to be tracked.

Download manager 150 obtains the tile(s) identified by dataset module 160, at 370. This may include providing a request for the tile(s) to server 110 and receiving the tile(s). Because the tile(s) sent by server 110 are compressed, the received tile(s) are desired to be decompressed and otherwise prepared for consumption by client 120. Download manager 160 thus controls data preparation workers 152 to queue, uncompress and pre-process the received tile(s) in parallel, at 372. Download manager 160 optionally caches the pre-processed data on disk cache 154, at 374. The pre-processed data are also sent to dataset module 160, at 376.

Dataset module 160 optionally caches data in memory cache 162 and provides a copy to execution engine 140, at 378. In some embodiments, a copy of the data is sent via message bus 128. In other embodiments, the location of the data is provided to execution engine 140, which accesses the data at that location.

Processing workers 142 are started once the requirements for the operations being performed by the worker are fulfilled, at 380. The requirements for starting are considered per epoch (start time), per part of data being processed and per group 170.

Processing workers 143 are then used to perform operations in the corresponding groups, at 382. The operations are ordered based upon the hierarchy described above. Thus, row and join dimensions are processed, followed by reduce dimensions, and then flatten dimensions. These are performed in order per part of the data being processed and per epoch. As each part of the data has completed processing in 382, the processing workers 143 tags the data part as completed, at 284. Execution engine 140 tracks the progression each data part per epoch, at 386. Progress tracker module 148 may be used by execution engine at 386. Further, for each reduce dimension which is to be merged and reduced, the intermediate state is tracked during processing, at 388. This may be performed using intermediate state manager module 146. Because progress and intermediate states are tracked at 386 and 388, execution engine 140 can determine whether processing has completed.

As part of processing, execution engine 140 also runs certain processing modules 142 if it is determined that sufficient progress has been made, at 390. For example, a first processing worker 144 may require results from a second processing worker 144. In order to improve efficiency, the first processing worker 144 may only be started after results for a sufficient number of data parts are received from the second processing worker. When processing of the part is completed by processing modules 142, execution engine sends the final results to the appropriate layer container 172. Using this final result, the chart can be progressively updated.

As processing of parts of the tiles are completed, the results are provided by execution engine 140 to the appropriate layer container 172. Thus, the view can be progressively updated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a manifest corresponding to a tree of a dataset having a number of points, the tree having a plurality of levels, each of the plurality of levels including a portion of the number of data points organized into at least one tile, the manifest indicating a particular number of data points in each of the at least one tile for each level of the tree;
   identifying, from the manifest and using a processor, a portion of the at least one tile of a level of the plurality of levels, the portion of the at least one tile including a portion of the dataset for a particular view on a display;
   sending, using the processor, a request for the portion of the at least one tile including the portion of the dataset;
   receiving, in response to the request, the portion of the at least one tile including the portion of the dataset;
   processing, in parallel using the processor, the portion of the dataset; and updating, using the processor, a view on the display to provide an updated view, the updated view including a first section of the portion of the dataset, the updating performed after the first section completes processing but before a remaining section of the portion of the dataset completes processing; and
   wherein the plurality of levels of the tree is based on the number of data points in the data set and at least one client resource, the portion of the at least one tile has a requested number of data points, the requested number of data points being a largest number of data points for the tree that includes the portion of the dataset and does not exceed a maximum number of data points, the maximum number of data points corresponding to the at least one client resource.

2. The method of claim 1, further comprising: updating the updated view with a second section of the portion of the dataset after the second section completes processing to provide an additional updated view, the additional updated view being closer to a final view including the portion of the dataset as processed than the updated view.

3. The method of claim 1, wherein the portion of the dataset includes a requested number of data points, the requested number of data points being at least 500,000 data points and not exceeding a maximum number of data points corresponding to at least one client resource, the maximum number of data points being at least one million data points.

4. The method of claim 1, wherein the requested number of data points is at least 500,000 data points and the maximum number of data points is at least one million data points.

5. The method of claim 1, wherein the dataset is a portion of a first dataset, the first dataset including the dataset and a second dataset, the tree and the dataset corresponding to a first interval, the second dataset having a second number of data points and corresponding to a second interval, the method further comprising: receiving a part of a second tree and an additional manifest for the second tree, the second tree being for the second dataset and the second interval, the second tree having a second plurality of levels, each of the second plurality of levels including a second portion of the second number of data points organized into at least a second tile, the additional manifest indicating an additional number of data points in each of the at least the second tile for each level of the second tree, the part of the second tree corresponding to an additional portion of the second dataset; and processing, in parallel using the processor, the additional portion of the second dataset; and wherein the updating further includes providing to a graphics processing unit memory the portion of the dataset and the additional portion of the second dataset as at least one binary memory.

6. The method of claim 1, further comprising: receiving at the processor a request to change from the view to a second view before the portion of the dataset has completed processing; and wherein the updating further includes discarding, using the processor, a part of the portion of the dataset before the part of the portion of the dataset has completed processing.

7. The method of claim 1, further comprising: receiving at the processor a request to change from the view to a second view on the display before the portion of the dataset has completed processing; and wherein the updating further includes determining, using the processor, whether a part of the portion of the dataset that is at least partially processed is reusable for the second view; and reusing, using the processor, the part of the portion of the dataset for the second view if the part is reusable.

8. The method of claim 1, wherein the processing in parallel further includes: splitting the portion of the dataset into a plurality of sections including the first section; processing the plurality of sections using a plurality of threads, each of the plurality of threads processing at least a portion of a section; tracking an intermediate state level for a first thread if the first thread processes a first portion of a section; providing the intermediate state from the first thread to a second thread if the second thread processes a second portion of the section; and merging a plurality of results from the plurality of threads.

9. The method of claim 1, further comprising: receiving, at the processor, a request to correlate an additional view with the view, the additional view corresponding to the additional portion of the dataset; and repeating the receiving, processing and updating for the additional view and the additional portion of the dataset.

10. The method of claim 1, wherein the portion of the dataset includes a column, the method further comprising: receiving, at the processor, a request to correlate the column with an additional column of an additional dataset; and providing, using the processor, an index for the column and the additional column.

11. A system, comprising:
    a processor configured to:
    receive a manifest corresponding to a tree of a dataset that has a number of points, the tree having a plurality of levels, each of the plurality of levels including a portion of the number of data points organized into at least one tile, the manifest indicating a particular number of data points in each of the at least one tile for each level of the tree,
    identify, from the manifest, a portion of the at least one tile of a level of the plurality of levels, the portion of the at least one tile including a portion of the dataset for a particular view on a display;

send a request for the portion of the at least one tile including the portion of the dataset;

receive, in response to the request, the portion of the at least one tile including the portion of the dataset;

process, in parallel, the portion of the dataset; and update a view on the display to provide an updated view, the updated view including a first section of the portion of the dataset, the update being performed after the first section completes processing but before a remaining section of the portion of the dataset completes processing;

wherein the plurality of levels of the tree is based on the number of data points in the data set and at least one client resource, the portion of the at least one tile has a requested number of data points, the requested number of data points being a largest number of data points for the tree that includes the portion of the dataset and does not exceed a maximum number of data points, the maximum number of data points corresponding to the at least one client resource; and a memory coupled to the processor and configured to provide the processor with instructions.

12. The system of claim 11, wherein the processor is further configured to: update the updated view with a second section of the portion of the dataset after the second section completes processing to provide an additional updated view, the additional updated view being closer to a final view including the portion of the dataset as processed than the updated view.

13. The system of claim 11, wherein the dataset is a portion of a first dataset, the first dataset includes the dataset and a second dataset, the tree and the dataset correspond to a first interval, the second dataset has a second number of data points and corresponds to a second interval and wherein the processor is further configured to: receive a part of a second tree and an additional manifest for the second tree, the second tree being for the second dataset and the second interval, the second tree having a second plurality of levels, each of the second plurality of levels including a second portion of the second number of data points organized into at least a second tile, the additional manifest indicating an additional number of data points in each of the at least the second tile for each level of the second tree, the part of the second tree corresponding to an additional portion of the second dataset; processing, in parallel using the processor, the additional portion of the second dataset; providing to a graphics processing unit memory the portion of the dataset and the additional portion of the second dataset as at least one binary memory.

14. The system of claim 11, wherein the processor is further configured to: receive a request to change from the view to a second view before the portion of the dataset has completed processing; wherein the processor being configured to update further includes the processor being configured to determine whether a part of the portion of the dataset that is at least partially processed is reusable for the second view; discard the part of the portion of the dataset before the part of the portion of the dataset has completed processing if the part of the portion of the dataset is not reusable; and reuse the part of the portion of the dataset for the second view if the part is reusable.

15. The system of claim 11, wherein to process in parallel, the processor is further configured to: split the portion of the dataset into a plurality of sections including the first section; process the plurality of sections using a plurality of threads, each of the plurality of threads processing at least a portion of a section; track an intermediate state level for a first thread if the first thread processes a first portion of a section; provide the intermediate state from the first thread to a second thread if the second thread processes a second portion of the section; and merge a plurality of results from the plurality of threads.

16. The system of claim 11, wherein the processor is further configured to: receive a request to correlate an additional view with the view, the additional view corresponding to the additional portion of the dataset; and repeat the receive, process in parallel and update for the additional view and the additional portion of the dataset.

17. The system of claim 11, wherein the portion of the dataset includes a column and wherein the processor is further configured to: receive a request to correlate the column with an additional column of an additional dataset; and provide an index for the column and the additional column.

18. A computer program product for processing a dataset having a number of data points, the computer program product being embodied in a nontransitory computer readable storage medium and comprising computer instructions for:

receiving a manifest corresponding to a tree of the dataset, the tree having a plurality of levels, each of the plurality of levels including a portion of the number of data points organized into at least one tile, the manifest indicating a particular number of data points in each of the at least one tile for each level of the tree;

identifying, from the manifest, a portion of the at least one tile of a level of the plurality of levels, the portion of the at least one tile including a portion of the dataset for a particular view on a display;

sending a request for the portion of the at least one tile including the portion of the dataset; receiving, in response to the request, the portion of the at least one tile including the portion of a dataset;

processing, in parallel, the portion of the dataset; and updating a view on the display to provide an updated view, the updated view including a first section of the portion of the dataset after the first section completes processing but before a remaining section of the portion of the dataset completes processing; and wherein the plurality of levels of the tree is based on the number of data points in the data set and at least one client resource, the portion of the at least one tile has a requested number of data points, the requested number of data points being a largest number of data points for the tree that includes the portion of the dataset and does not exceed a maximum number of data points, the maximum number of data points corresponding to the at least one client resource.

19. A system for providing a view of a dataset having a number of data points, the system comprising: a group module for controlling the view on a display, determining a portion of the dataset corresponding to the view and providing a request for the portion of the dataset; a chart module for updating the view on the display; a dataset module coupled with the group module, the dataset module receiving the request for the portion of the dataset, the dataset including a tree and a manifest, the tree having a plurality of levels, each of the plurality of levels including a portion of the number of data points organized into at least one tile, the plurality of levels being based on the number of data points in the data set and at least one client resource of a client, the manifest indicating a particular number of data points in each of the at least one tile for each level of the tree, the dataset module further determining, based on the manifest, a level of the plurality of levels of the tree and a portion of the at least one tile for the level including the portion of the data, the portion of the at least one tile including not more than a maximum amount of data, the maximum amount of data corresponding to the at least one client resource; a download manager, coupled with the dataset module and for receiving from the dataset module an identification of the portion of the at least one tile of the level including the portion of the dataset, the download manager controlling an external request for, reception of and uncompression of the portion of the at least one tile of the level; an execution engine coupled with the group module, the download manager and the dataset module, the execution engine for receiving the request for the portion of the dataset corresponding to the view from the group module, for receiving the identification of the portion of the at least one tile of the level from the dataset module, for receiving the portion of the at least one tile after uncompression and for controlling processing in parallel of the portion of the dataset such that after a first section of the portion of the dataset completes processing but before a remaining section of the portion of the dataset completes processing the first section is provided to the chart module and such that the chart module updates the view after the first section completes processing but before the remaining section completes processing.

20. The system of claim 19 wherein the download manager further controls uncompression and preparation of the portion of the dataset for use by controlling a plurality of data preparation workers, the plurality of data preparation workers for uncompressing and preparing the portion of the dataset in parallel.

21. The system of claim 19 wherein the execution engine further controls processing in parallel of the portion of the dataset for use by splitting the portion of the dataset into a plurality of threads, using and tracking a progress of each of a plurality of processing module workers, the plurality of processing module workers for processing the plurality of threads processing the portion of the dataset in parallel and merging a plurality of results from the plurality of threads.

22. The system of claim 21 wherein in response to receiving a request to change from the view to a second view before the portion of the dataset has completed processing, the execution engine determines whether a part of the portion of the dataset that is at least partially processed is reusable for the second view, discards a part of the portion of the dataset before the part of the portion of the dataset has completed processing if the part of the portion of the dataset is not reusable and reuses the part of the portion of the dataset for the second view if the part is reusable.

* * * * *

UNITED STATES PATENT AND TRADEMARK OFFICE
CERTIFICATE OF CORRECTION

PATENT NO. : 11,204,962 B2
APPLICATION NO. : 16/228195
DATED : December 21, 2021
INVENTOR(S) : Seyed Amir Yahyavi Firouz Abadi et al.

It is certified that error appears in the above-identified patent and that said Letters Patent is hereby corrected as shown below:

In the Specification

In Column 4, Line(s) 10 & 11, delete "-180_0_0_-90_0" and Insert -- -180_0_-90_0--, therefor.
In Column 4, Line(s) 11, delete "-18_0_0_90" and Insert -- -180_0_0_90--, therefor.

Signed and Sealed this
Thirteenth Day of December, 2022

Katherine Kelly Vidal
*Director of the United States Patent and Trademark Office*